(12) United States Patent
Uchiyama et al.

(10) Patent No.: US 12,028,830 B2
(45) Date of Patent: *Jul. 2, 2024

(54) TERMINAL DEVICE, WIRELESS COMMUNICATION DEVICE, WIRELESS COMMUNICATION METHOD, AND COMPUTER PROGRAM

(71) Applicant: Sony Corporation, Tokyo (JP)

(72) Inventors: Hiromasa Uchiyama, Tokyo (JP); Hiroaki Takano, Saitama (JP); Atsushi Yoshizawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 82 days.

This patent is subject to a terminal disclaimer.

(21) Appl. No.: 16/866,549

(22) Filed: May 5, 2020

(65) Prior Publication Data

US 2020/0267688 A1 Aug. 20, 2020

Related U.S. Application Data

(63) Continuation of application No. 15/563,800, filed as application No. PCT/JP2016/057818 on Mar. 11, 2016, now Pat. No. 10,687,304.

(30) Foreign Application Priority Data

Apr. 9, 2015 (JP) .................. 2015-080357

(51) Int. Cl.
*H04W 68/00* (2009.01)
*H04W 68/12* (2009.01)
(Continued)

(52) U.S. Cl.
CPC ......... *H04W 68/005* (2013.01); *H04W 68/12* (2013.01); *H04W 88/04* (2013.01); *H04W 92/18* (2013.01); *H04W 92/10* (2013.01)

(58) Field of Classification Search
CPC ... H04W 68/005; H04W 68/12; H04W 88/04; H04W 92/18; H04W 92/10
See application file for complete search history.

(56) References Cited

U.S. PATENT DOCUMENTS

| | | | |
|---|---|---|---|
| 8,423,031 B2* | 4/2013 | Nakatsugawa | H04B 7/155 455/445 |
| 2004/0063451 A1* | 4/2004 | Bonta | H04W 88/04 455/518 |

(Continued)

FOREIGN PATENT DOCUMENTS

| | | |
|---|---|---|
| CN | 102907139 A | 1/2013 |
| JP | 2009544244 A | 12/2009 |

(Continued)

OTHER PUBLICATIONS

Chinese Office Action dated May 26, 2020, issued in corresponding Chinese Patent Application No. 201680019241.8, 24 pages.

(Continued)

*Primary Examiner* — Mehmood B. Khan
(74) *Attorney, Agent, or Firm* — XSENSUS LLP

(57) ABSTRACT

[Object] To provide a wireless communication device which enables paging to be effectively performed with respect to a terminal device that is a target of paging in a system in which another terminal device acts like a cell.
[Solution] Provided is a terminal device including: an acquisition unit configured to acquire a paging message from a base station; and a control unit configured to execute paging with respect to one or more other terminal devices that perform wireless communication with the base station via the terminal device on the basis of the paging message acquired by the acquisition unit.

15 Claims, 20 Drawing Sheets

(51) Int. Cl.
*H04W 88/04* (2009.01)
*H04W 92/10* (2009.01)
*H04W 92/18* (2009.01)

(56) References Cited

U.S. PATENT DOCUMENTS

| | | | | |
|---|---|---|---|---|
| 2007/0264955 | A1* | 11/2007 | Tsai | H04W 68/00 455/186.1 |
| 2008/0045145 | A1* | 2/2008 | Nakatsugawa | H04B 7/155 455/11.1 |
| 2008/0076424 | A1* | 3/2008 | Barber | H04W 12/062 455/436 |
| 2008/0220769 | A1* | 9/2008 | Qi | H04W 52/0216 455/426.1 |
| 2008/0220770 | A1* | 9/2008 | Qi | H04W 68/00 455/426.1 |
| 2008/0242341 | A1* | 10/2008 | Wu | H04W 68/00 455/525 |
| 2009/0017845 | A1* | 1/2009 | Wu | H04W 68/02 455/458 |
| 2009/0055504 | A1* | 2/2009 | Xie | H04W 60/00 709/207 |
| 2009/0219844 | A1* | 9/2009 | Soliman | H04W 88/04 370/311 |
| 2009/0221261 | A1* | 9/2009 | Soliman | H04W 88/04 455/343.2 |
| 2010/0184458 | A1* | 7/2010 | Fodor | H04W 52/0216 455/574 |
| 2010/0203905 | A1* | 8/2010 | Chaubey | H04W 68/00 455/458 |
| 2010/0248752 | A1* | 9/2010 | Yu | H04W 72/23 455/458 |
| 2011/0076960 | A1* | 3/2011 | Yun | H04W 24/10 455/67.14 |
| 2011/0237218 | A1* | 9/2011 | Aoyama | H04W 76/50 455/404.1 |
| 2011/0249571 | A1* | 10/2011 | Das | H04W 88/182 709/227 |
| 2011/0255444 | A1* | 10/2011 | Soliman | H04L 67/62 370/255 |
| 2012/0033595 | A1* | 2/2012 | Aoyama | H04W 76/28 370/311 |
| 2012/0064899 | A1* | 3/2012 | Musiige | H04W 68/04 455/445 |
| 2012/0122495 | A1* | 5/2012 | Weng | H04W 68/025 455/458 |
| 2012/0178485 | A1 | 7/2012 | Zeira et al. | |
| 2012/0231801 | A1* | 9/2012 | Nakatsugawa | H04W 68/00 455/445 |
| 2012/0238208 | A1 | 9/2012 | Bienas et al. | |
| 2013/0130684 | A1* | 5/2013 | Gomes | H04W 4/70 455/435.1 |
| 2013/0176890 | A1* | 7/2013 | Sharma | H04W 88/04 370/252 |
| 2013/0182632 | A1* | 7/2013 | Maeda | H04W 4/70 370/312 |
| 2013/0229965 | A1* | 9/2013 | Bressanelli | H04W 76/28 370/311 |
| 2014/0106737 | A1* | 4/2014 | Wilhelmsson | H04W 40/22 455/422.1 |
| 2014/0349694 | A1* | 11/2014 | Raghothaman | H04W 40/22 455/509 |
| 2015/0223199 | A1* | 8/2015 | Arkko | H04W 52/0225 455/458 |
| 2015/0304986 | A1 | 10/2015 | Eriksson | |
| 2016/0262129 | A1* | 9/2016 | Better | H04W 52/38 |
| 2017/0142686 | A1* | 5/2017 | Zhang | H04W 68/025 |
| 2017/0244469 | A1* | 8/2017 | Seo | H04B 7/15507 |
| 2018/0077624 | A1* | 3/2018 | Jung | H04W 8/08 |
| 2018/0375902 | A1* | 12/2018 | Wong | H04W 8/08 |

FOREIGN PATENT DOCUMENTS

| | | |
|---|---|---|
| JP | 2011-514777 A | 5/2011 |
| JP | 2012-5090 A | 1/2012 |
| JP | 2013524691 A | 6/2013 |
| JP | 2013-529409 A | 7/2013 |
| JP | 2013544452 A | 12/2013 |
| JP | 2014-507865 A | 3/2014 |
| WO | WO 2011/080833 A1 | 7/2011 |
| WO | 2011/123755 A1 | 10/2011 |
| WO | WO-2018014359 A1 * | 1/2018 ............ H04B 1/385 |

OTHER PUBLICATIONS

Japanese Office Action dated Jan. 30, 2020, issued in corresponding Japanese Patent Application No. 2017-511514.
European Communication dated Jun. 14, 2019 in European Application No. 16 776 375.4.
Extended European Search Report issued in corresponding EP 16 77 6375, dated Nov. 8, 2018, 9 pages.
International Search Report dated May 24, 2016 in PCT/JP2016/057818.

* cited by examiner

FIG. 5

|        | i_s = 0    | i_s = 1    | i_s = 2    | i_s = 3    |
|--------|------------|------------|------------|------------|
| Ns = 1 | Subframe 9 | N/A        | N/A        | N/A        |
| Ns = 2 | Subframe 4 | Subframe 9 | N/A        | N/A        |
| Ns = 4 | Subframe 0 | Subframe 4 | Subframe 5 | Subframe 9 |

FIG. 6

| | is = 0 | is = 1 | is = 2 | is = 3 |
|---|---|---|---|---|
| $N_S = 1$ | Subframe 0 | N/A | N/A | N/A |
| $N_S = 2$ | Subframe 0 | Subframe 5 | N/A | N/A |
| $N_S = 4$ | Subframe 0 | Subframe 1 | Subframe 5 | Subframe 6 |

FIG. 11

| Case | FINAL DESTINATION | STATE OF MASTER | STATE OF SLAVE |
|---|---|---|---|
| 1 | MASTER | IDLE | ANY |
| 2 | SLAVE | IDLE | IDLE |
| 3 | SLAVE | IDLE | RRC Connected |
| 4 | SLAVE | RRC Connected | IDLE |
| 5 | SLAVE | RRC Connected | RRC Connected |

FIG. 14

| Information Elements | |
|---|---|
| UE Identity IndeX (0 to 1023) | |
| UE Paging Identity (S-TMSI or IMSI) | |
| Paging DRX (32,64,128,256) | |
| Core Network Domain (PS or CS) | |
| List of Tracking Area Identities (TAI) (1 to 256 instances) | TAI |
| List of Closed Subscriber Group (GSG) Identities (0 to 256 instances) | CSG Id |
| Paging Priority | |

FIG. 15

| Information Elements | | |
|---|---|---|
| Paging Record List | Paging Record (1 to 16 instances) | UE Identity (S-TMSI or IMSI) |
| | | Core Network Domain (CS or PS) |
| System Information Modification (True, False) | | |
| ETWS Indication (True, False) | | |
| CMAS Indication (True, False) | | |

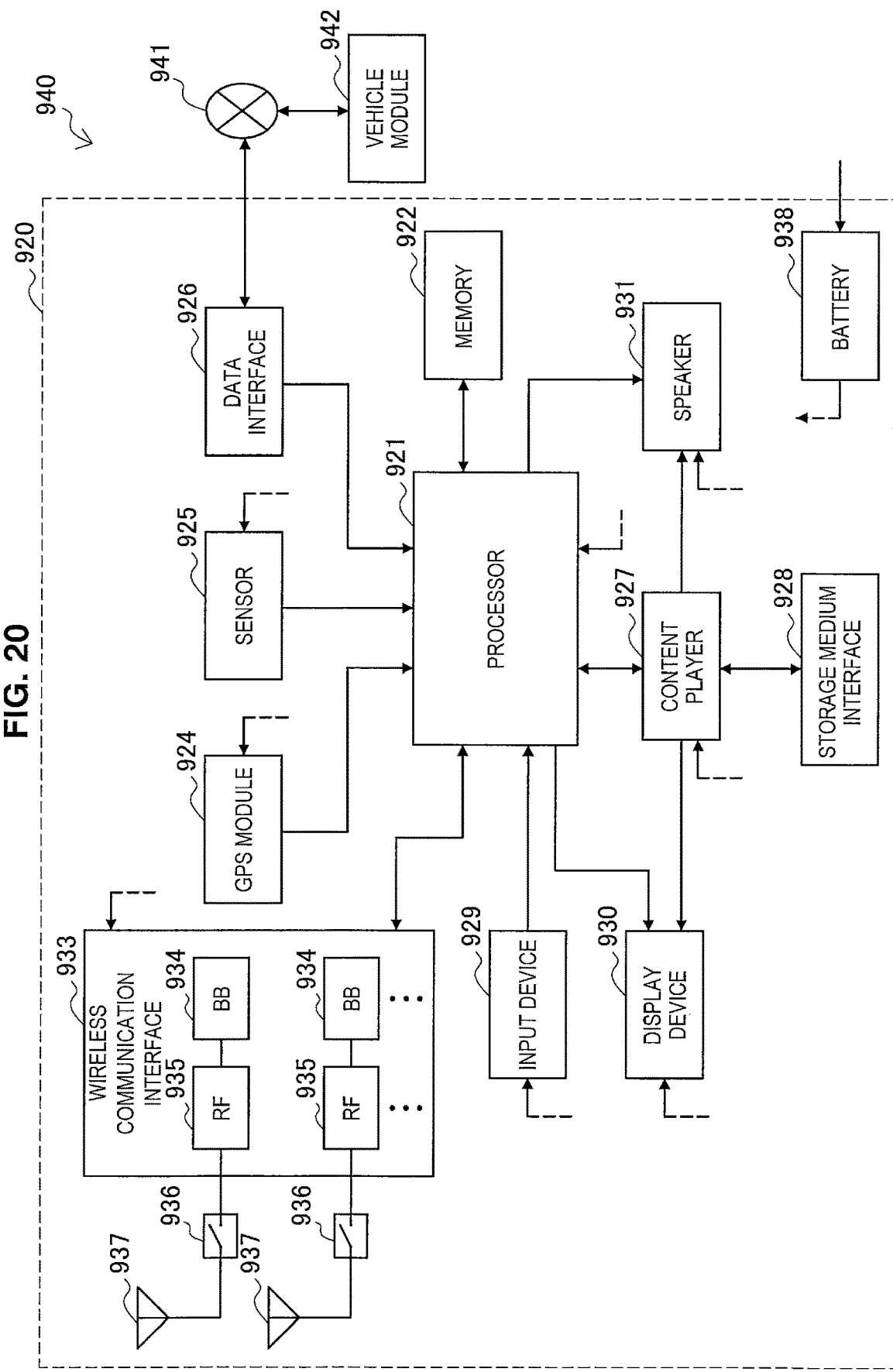

TERMINAL DEVICE, WIRELESS COMMUNICATION DEVICE, WIRELESS COMMUNICATION METHOD, AND COMPUTER PROGRAM

CROSS-REFERENCE TO RELATED APPLICATIONS

The present application is a continuation of U.S. application Ser. No. 15/563,800, filed Oct. 2, 2017, which is based on PCT filing PCT/JP2016/057818, filed Mar. 11, 2016, which claims priority to JP 2015-080357, filed Apr. 9, 2015, the entire contents of each are incorporated herein by reference.

TECHNICAL FIELD

The present disclosure relates to a terminal device, a wireless communication device, a wireless communication method, and a computer program.

BACKGROUND ART

A technology called paging has been used in a Long Term Evolution (LTE) platform (e.g., see Patent Literature 1). Paging is a technique in which mostly a network side (eNodeB) calls a terminal device being in an idle (IDLE) mode, and is used for incoming data or audio, giving urgent notifications with regard to disaster information, or the like.

CITATION LIST

Patent Literature

Patent Literature 1: JP 2012-5090A

DISCLOSURE OF INVENTION

Technical Problem

In paging in the past, only a terminal device has been in an idle mode in communication with an eNodeB. However, it is assumed in a system in which a terminal device acts like a cell that the terminal device playing a role of a cell as well as a terminal device that is a target of paging may be in an idle mode. A new mechanism of paging adapted for this system environment has been demanded.

Therefore, the present disclosure proposes a novel and improved terminal device, wireless communication device, wireless communication method, and computer program which enable paging to be effectively performed with respect to a terminal device that is a target of paging in a system in which another terminal device acts like a cell.

Solution to Problem

According to the present disclosure, there is provided a terminal device including: an acquisition unit configured to acquire a paging message from a base station; and a control unit configured to execute paging with respect to one or more other terminal devices that perform wireless communication with the base station via the terminal device on the basis of the paging message acquired by the acquisition unit.

Further, according to the present disclosure, there is provided a wireless communication device including: a control unit configured to execute paging with respect to a first terminal device and a second terminal device that performs wireless communication via the first terminal device; and an acquisition unit configured to acquire information for prescribing a timing of paging by the control unit with respect to the second terminal device independently of a timing of paging with respect to the first terminal device.

Further, according to the present disclosure, there is provided a wireless communication method including: acquiring a paging message from a base station; and executing paging with respect to another terminal device that performs wireless communication with the base station via a terminal device on the basis of the acquired paging message.

Further, according to the present disclosure, there is provided a wireless communication method including: executing paging with respect to a first terminal device and a second terminal device that performs wireless communication via the first terminal device; and acquiring information for prescribing a timing of paging with respect to the second terminal device independently of a timing of paging with respect to the first terminal device.

Further, according to the present disclosure, there is provided a computer program causing a computer to execute: acquiring of a paging message from a base station; and paging with respect to another terminal device that performs wireless communication with the base station via a terminal device on the basis of the acquired paging message.

Further, according to the present disclosure, there is provided a computer program causing a computer to execute: paging with respect to a first terminal device and a second terminal device that performs wireless communication via the first terminal device; and acquiring of information for prescribing a timing of paging with respect to the second terminal device independently of a timing of paging with respect to the first terminal device.

Advantageous Effects of Invention

According to the present disclosure described above, it is possible to provide a novel and improved terminal device, wireless communication device, wireless communication method, and computer program which enable paging to be effectively performed with respect to a terminal device that is a target of paging in a system in which another terminal device acts like a cell.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is an illustrative diagram illustrating a lookup table in the case of FDD.

FIG. 6 is an illustrative diagram illustrating a lookup table in the case of TDD.

FIG. 11 is an illustrative diagram illustrating a combination of statuses.

FIG. 14 is an illustrative diagram illustrating a structure of an S1AP: paging message that has already been stipulated.

FIG. 15 is an illustrative diagram illustrating a structure of an RRC: paging message that has already been stipulated.

FIG. 20 is a block diagram illustrating an example of a schematic configuration of a car navigation device 920 to which the technology of the present disclosure may be applied.

MODE(S) FOR CARRYING OUT THE INVENTION

Figure 1:
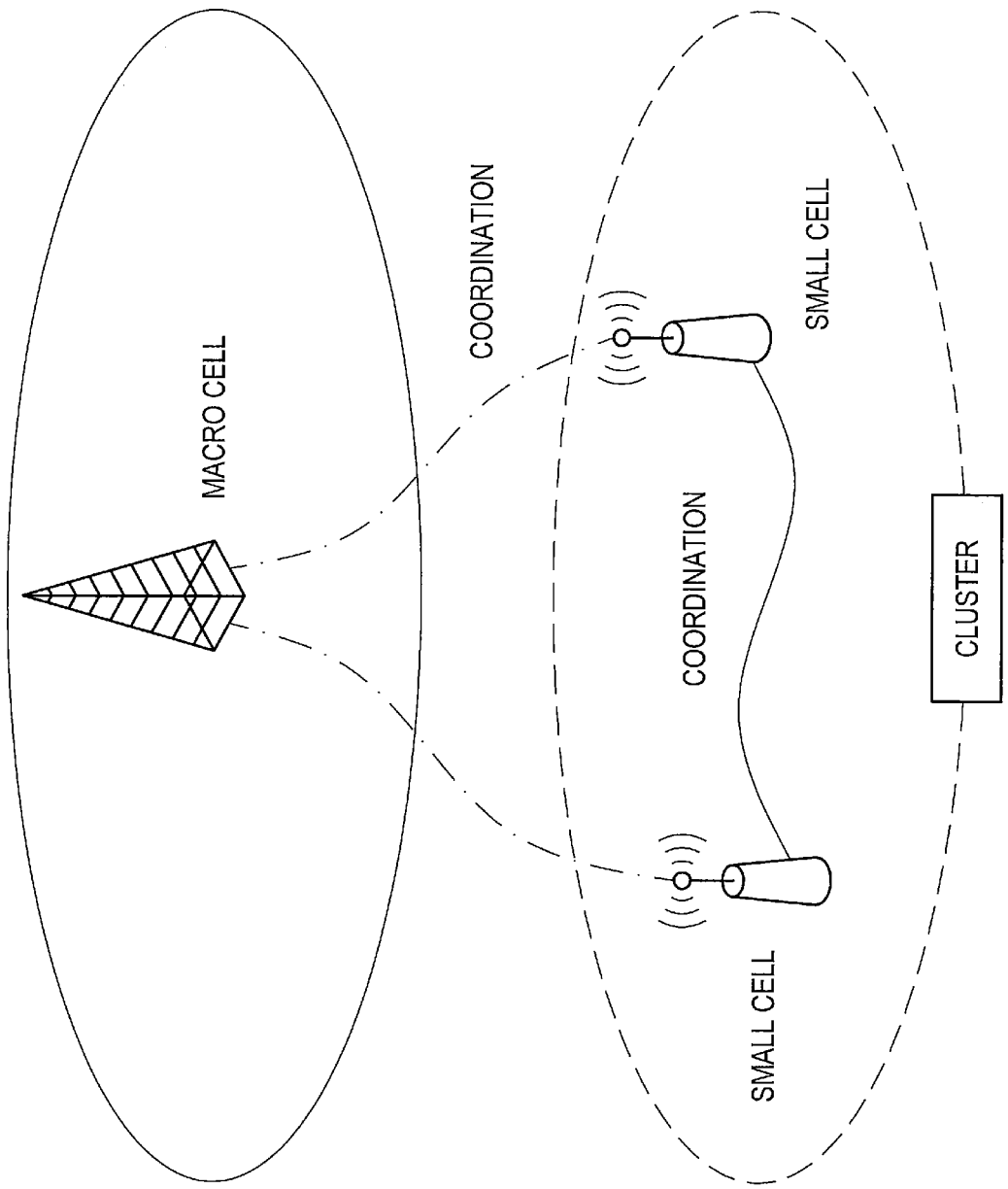
FIG. 1 is an illustrative diagram for describing small cell enhancement (SCE).

Hereinafter, (a) preferred embodiment(s) of the present disclosure will be described in detail with reference to the appended drawings. In this specification and the appended drawings, constituent elements that have substantially the same function and structure are denoted with the same reference numerals, and repeated explanation of these constituent elements is omitted.

Note that description will be provided in the following order.
1. Embodiment of present disclosure
1.1. Background
1.2. Example of configuration
1.2.1. Example of configuration of communication system
1.2.2. Example of configuration of terminal device
1.2.3. Example of configuration of base station
1.2.4. Example of configuration of control entity
1.3. Example of operation
2. Application examples
3. Conclusion

1. EMBODIMENT OF PRESENT DISCLOSURE

[1.1. Background]

First, a background of an embodiment of the present disclosure will be described before the embodiment of the present disclosure is described in detail.

Recent wireless communication environments are facing a rapid increase of data traffic. As a countermeasure for future rapid increase of traffic, the 3GPP has currently discussed small cell enhancement in which small cell base stations are deployed in a range of a macro cell base station at a high density to raise a density of a network and disperse traffic. FIG. 1 is an illustrative diagram for describing small cell enhancement (SCE). It is assumed in SCE that a high band higher than or equal to 3 GHz is used as a frequency band for small cells such as indoor cells and SCE aims to improve an overall capacity by deploying small cell base stations in a macro area and offloading data traffic onto the small cell side.

In addition, as a proposal for 5G that is a next generation wireless communication scheme, an ultra-dense network on which small cell base stations with narrow coverage are deployed in a range of a macro cell base station at an extremely high density using a higher frequency or the like has been proposed.

When small cells are deployed at such a high density, however, there are many realistic problems to be solved including securing a space in which the base stations are deployed, expansion of power consumption of a network, increases in facility costs, maintenance costs, and the like. Thus, a network for which flexible countermeasures can be set in accordance with network traffic conditions at a lower cost while handling a rapid increase in traffic is desirable.

Thus, localized network management (LNM) in which user equipment (UE) having a function of a small cell base station constructs a virtual small cell network in an area in which no small cell base station is present in a heterogeneous network environment has been proposed. In LNM, virtual small cells can be flexibly deployed at a low cost in accordance with a state of a network.

Figure 2:
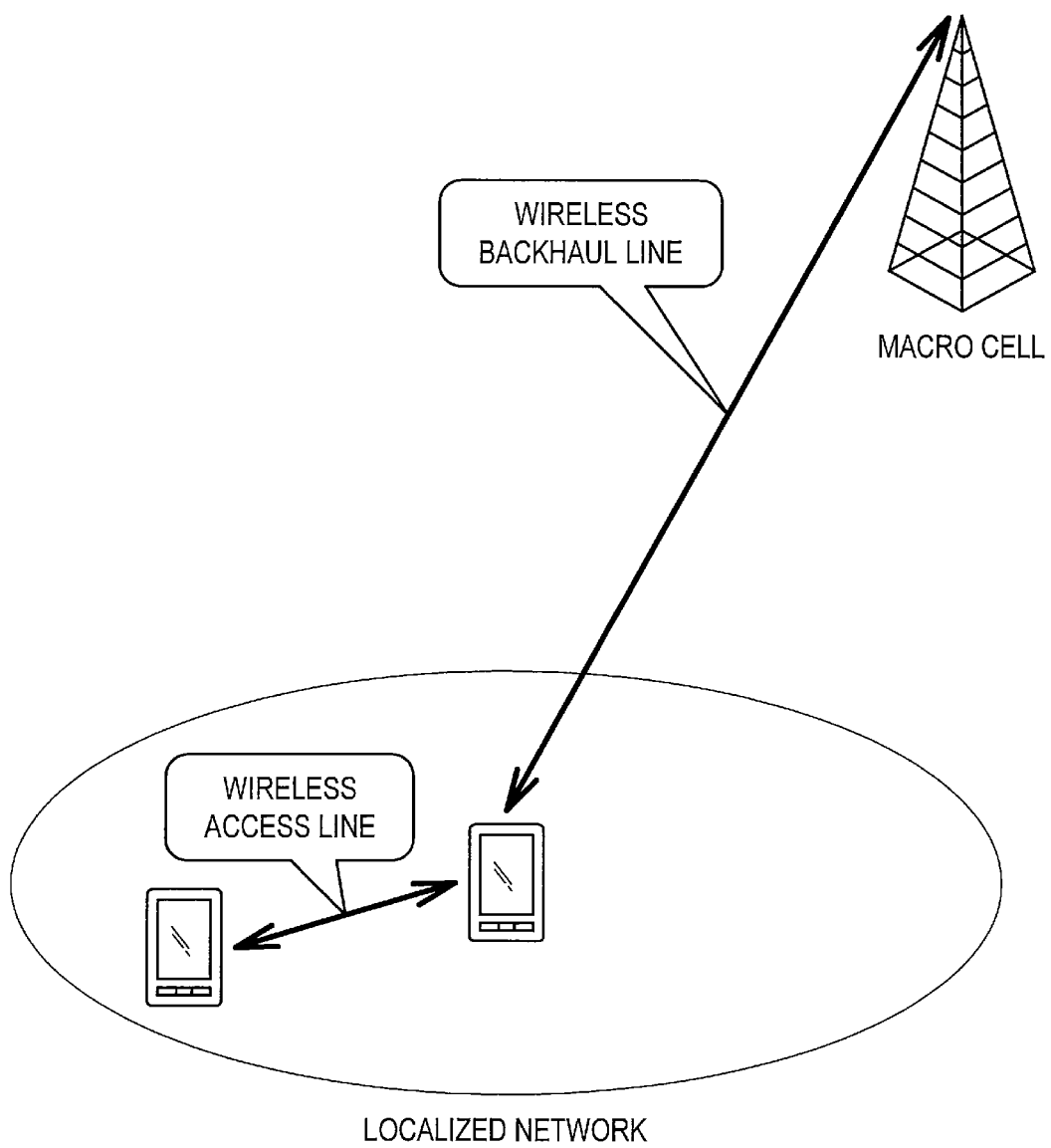
FIG. 2 is an illustrative diagram illustrating an example of a localized network (LN).

FIG. 2 is an illustrative diagram illustrating an example of a localized network (LN). The LN is constituted by a terminal that can be a virtual small cell (which will also be referred to as a "master terminal" below) and a terminal connected to the master terminal (which will also be referred to as a "slave terminal" below). The LN includes a backhaul line on which a macro cell base station and the master terminal communicate with each other and an access line on which the master terminal and the slave terminal communicate with each other. The backhaul line may be wireless or wired.

When the master terminal simultaneously performs transmission and reception on the backhaul line and the access line on the LN, a transmission signal normally wanders around a receiver of the terminal as long as isolation is not secured, and thus the problem of interference arises. For this reason, the master terminal performs communication on the backhaul line and the access line in a time division manner on the LN. When communication is performed on the backhaul line and the access line in a time division manner, securing of a buffer area in the master terminal or latency on the slave terminal side is a considerable problem.

As a means to secure a buffer area in the master terminal and solve latency on the slave terminal side, a full duplex localized network (FDLN) on which simultaneous transmission/reception is possible on the backhaul line and the access line by applying full duplex communication to the master terminal has been proposed.

Accordingly, simultaneous transmission/reception based on full duplex communication using the same frequency resource is possible, thus a buffer area in the master terminal can be secured and latency of the slave terminal side can be solved, and thus an increase in a capacity of the whole network can be expected.

The technology called paging has been used on the LTE platform. Paging is a technique of mostly a network side (eNodeB) calling a terminal device being in an idle (IDLE) mode, and is used for incoming data or audio, giving urgent notifications with regard to disaster information, or the like.

Figure 3:
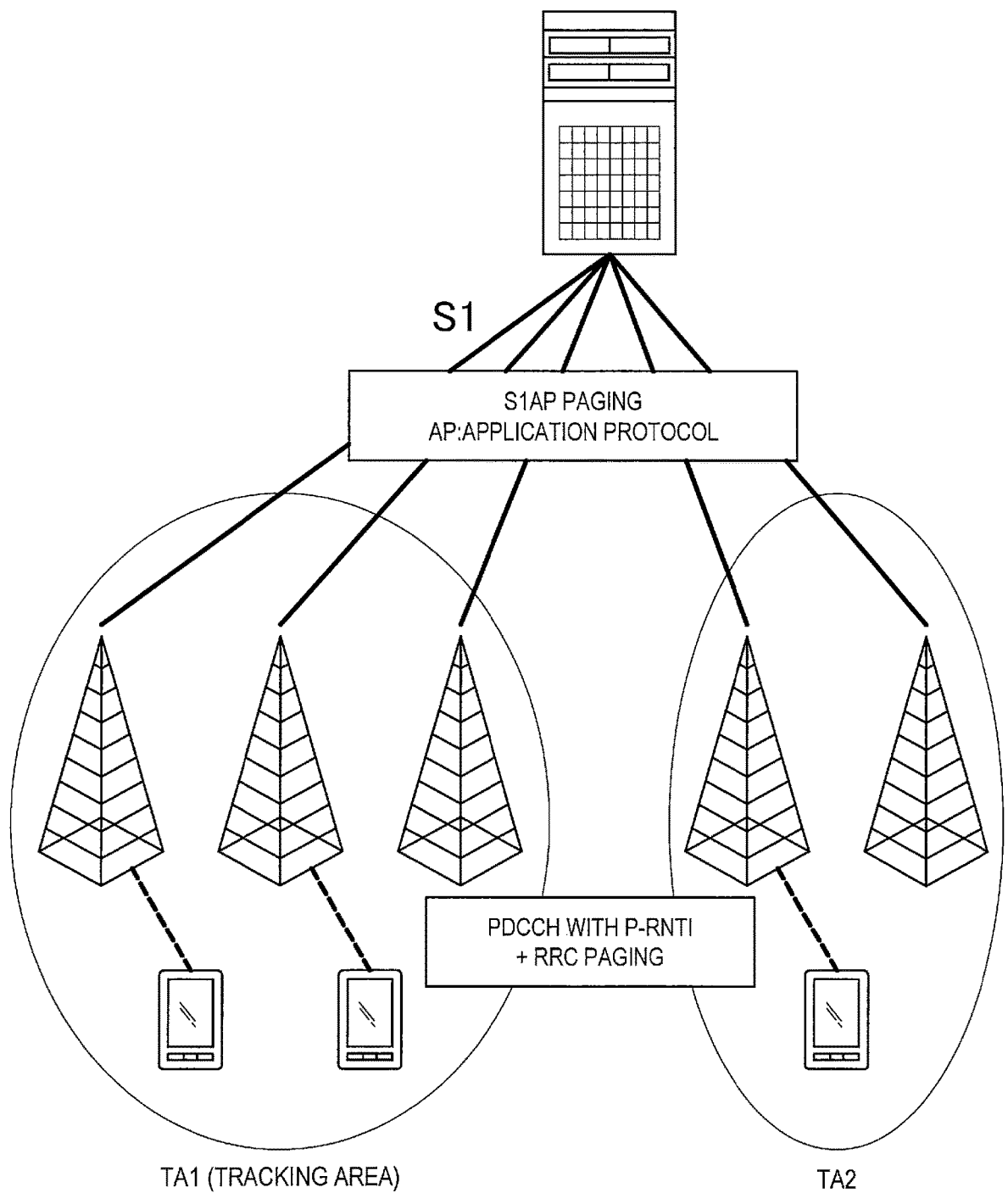
FIG. 3 is an illustrative diagram illustrating an overview of paging on an LTE platform.

FIG. 3 is an illustrative diagram illustrating an overview of paging on the LTE platform. In addition, FIG. 4 is a flow diagram showing an operation flow of paging on the LTE platform.

Figure 4:
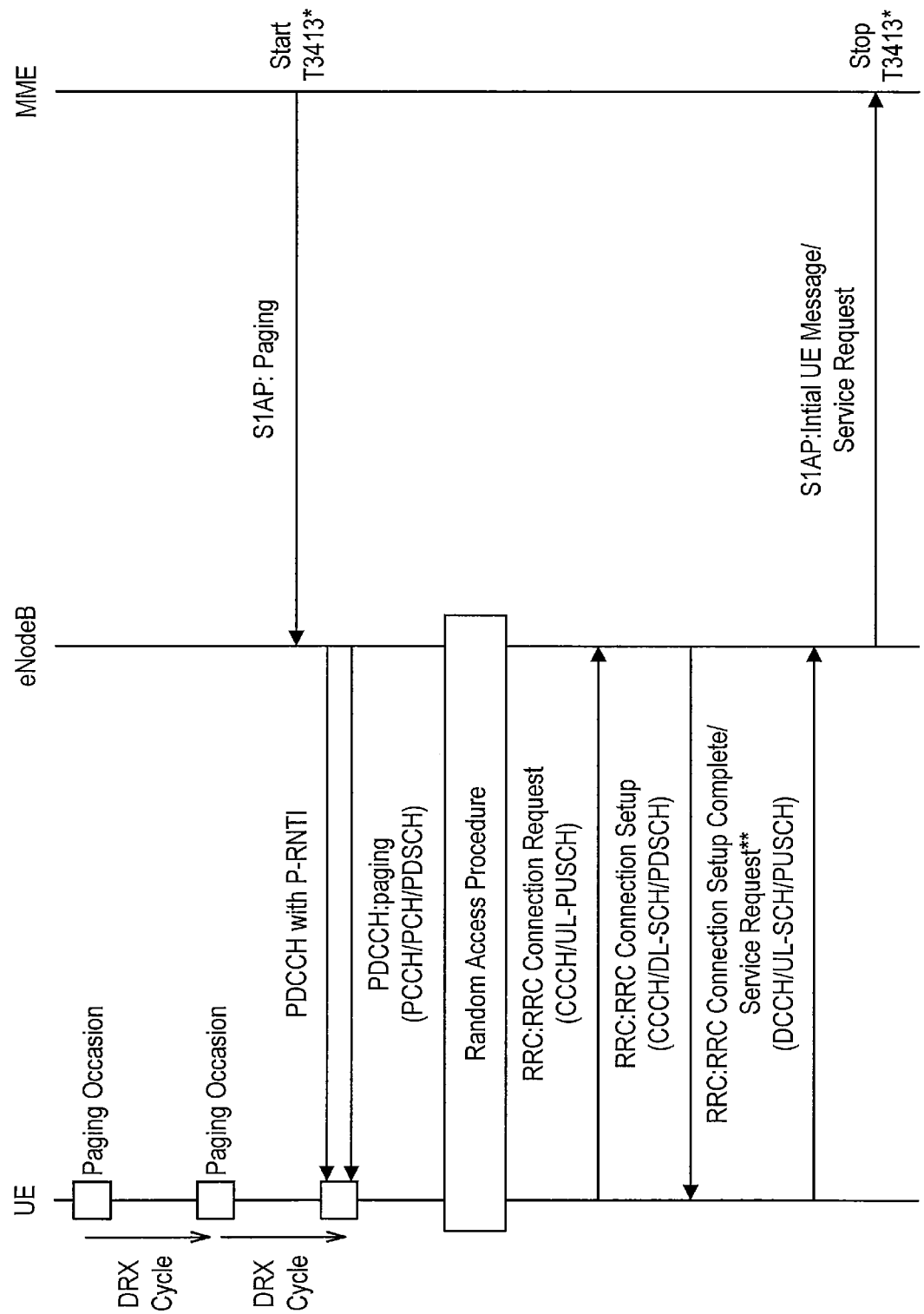
FIG. 4 is a flow diagram showing an operation flow of paging on the LTE platform.

Paging is performed by notifying UE of a paging message from a mobility management entity (MIME) on a network side via an eNodeB as illustrated in FIGS. 3 and 4. An operation performed from the network side to the eNodeB is called S1AP: paging and an operation performed from the eNodeB to the UE is called RRC: paging.

The MIME transmits an S1AP: paging signal to a plurality of tracking areas (TAs or position registered areas), and each eNodeB creates an RRC: paging signal on the basis of the received signal and notifies the UE of the signal. In a case where the UE discovers the paging signal destined for itself, the UE shifts to an RACH procedure and transitions to an RRC-connected state with respect to the eNodeB. Note that a timer T3413 is set in paging on the LTE platform.

In order to exactly receive paging, the UE has to properly read paging information transmitted from the network side. However, the UE consumes an enormous amount of power to keep on standby for a signal from the network side. Thus, paging signals are effectively received on the LTE platform by adopting an intermittent reception scheme that is called discontinuous reception (DRX) as illustrated in FIG. 4.

An existing paging process will be briefly described using FIG. 4. The MME starts the timer T3413 and transmits S1AP: paging to the eNodeB. In addition, the UE is periodically on standby for an RRC: paging message from the eNodeB on the basis of a DRX cycle. The eNodeB transmits an RRC: paging message to the eNodeB in accordance with the DRX cycle. When the RRC: paging message is received from the eNodeB, the UE starts a random access procedure to establish communication with the eNodeB on the basis of the RRC: paging message.

The UE transmits an RRC connection request to the eNodeB, and the eNodeB transmits an RRC connection setup message to the UE. The UE transmits an RRC connection setup complete message to the eNodeB in response to reception of the RRC connection setup message. When the RRC connection setup complete message is received from the UE, the eNodeB transmits a service request to the MIME. The MIME stops the timer T3413 when it receives the service request from the eNodeB.

DRX is a mechanism for performing intermittent reception at a uniform cycle. A default value of an interval is reported in SIB2 and is set in the following range.

{32, 64, 128, 256} [Radio Frames]

The values of the interval can also be requested by the UE toward the network side. In this case, the same value can be selected and the UE can notify the network side of the value using an "attach request" or a "tracking area update request." Note that, in a case where a default value and a requested value by the UE are set, a smaller value between the values is employed.

The UE sets a frame in which a paging signal is received (a paging frame or a PF) on the basis of information such as the determined paging interval and UE_ID. A system frame number (SFN) of the PF is set through calculation using the following formula.

$$SFN \bmod T = (T/N) \times (UE\_ID \bmod N)$$

Here, T represents a DRX cycle of the UE at which a paging message is received and expressed with the number of radio frames. N represents the minimum value between T and nB. nB represents is a value selected from 4T, 2T, T, T/2, T/4, T/8, T/16, and T/32.

In addition, UE_ID is obtained using the following formula.

$$UE\_ID = IMSI \bmod 1024$$

Here, IMSI stands for international mobile subscriber identity (IMSI), and UE knows its own IMSI. The UE notifies the mobile management entity (MME) of the IMSI of the UE, and the MME notifies the eNodeB of the IMSI, or UE_ID calculated by the MIME.

Next, the UE determines a subframe in which the paging signal is received (a paging occasion or a PO) among the PFs obtained as above. A subframe number of the PO is obtained as follows. First, index i_s is obtained using the following formula.

$$i\_s = \mathrm{floor}(UE\_ID/N) \bmod Ns$$

Here, Ns represents the maximum value between 1 and nB/T. In addition, FIG. 5 is an illustrative diagram illustrating a lookup table in the case of FDD, and FIG. 6 is an illustrative diagram illustrating a lookup table in the case of TDD.

Here, Ns is set uniquely to a cell, and the greater a value of Ns is, the higher a paging capacity becomes. It is not possible to set an MBSFN subframe since a synchronization signal and system information are included in Subframes 0 and 5. Thus, if paging information is also included in these subframes, a specification impact is minimal.

However, it is difficult for a cell having a low paging capacity (a narrow band) to cause Subframes 0 and 5 to include the paging information because the subframes have no resources. For this reason, there is a tendency that particularly Subframes 4 and 9 are allocated to a cell having a low paging capacity other than Subframes 0 and 5 to perform paging. It is possible to read a synchronization signal and system information immediately after paging with Subframes 4 and 9, which is efficient for the UE. Meanwhile, Subframes 0 and 5 can be allocated to a cell having considerable spare Subframes 0 and 5 (a cell having a high paging capacity) to perform paging.

It is necessary in a case of TDD to perform mapping at least to DL subframes, and thus Subframes 0 and 5 that are set for DL are prioritized at all times. In this case, a collision between paging information and system information is also allowed. A cell with a high paging capacity can use additional Subframes 1 and 6 for paging. Subframe 1 is a special subframe, and Subframe 6 is a special subframe or a DL subframe. Since special subframes use a restricted PDCCH area, it is not possible for a cell with a low paging capacity to use the special subframe for paging. Thus, the special subframes are allocated only to a cell with a high paging capacity.

It is possible to cause a terminal device to effectively receive a paging signal by adopting DRX on the LTE platform as described above.

In paging of the past, a terminal device is the only entity that is likely to be in an idle mode in communication with an eNodeB. However, in a system such as LNM in which a terminal device acts like a cell, a terminal device that plays a role of a cell as well as a terminal device that is a target of paging is likely to be in an idle mode. A new mechanism of paging adapted for the system environment in which a terminal device acts like a cell has been demanded.

Therefore, the inventors of the present disclosure have closely studied a technology that enables paging to be effectively performed with respect to a terminal device that is a target of paging in a system in which another terminal device acts like a cell, in consideration of the above-described background. As a result, the inventors of the present disclosure has invented the technology that enables paging to be effectively performed with respect to a terminal device that is a target of paging in a system in which another terminal device acts like a cell.

The background of the embodiment of the present disclosure has been described above. Next, the embodiment of the present disclosure will be described in detail.

(1.2. Example of Configuration)

(1.2.1. Example of Configuration of Communication System)

Figure 7:
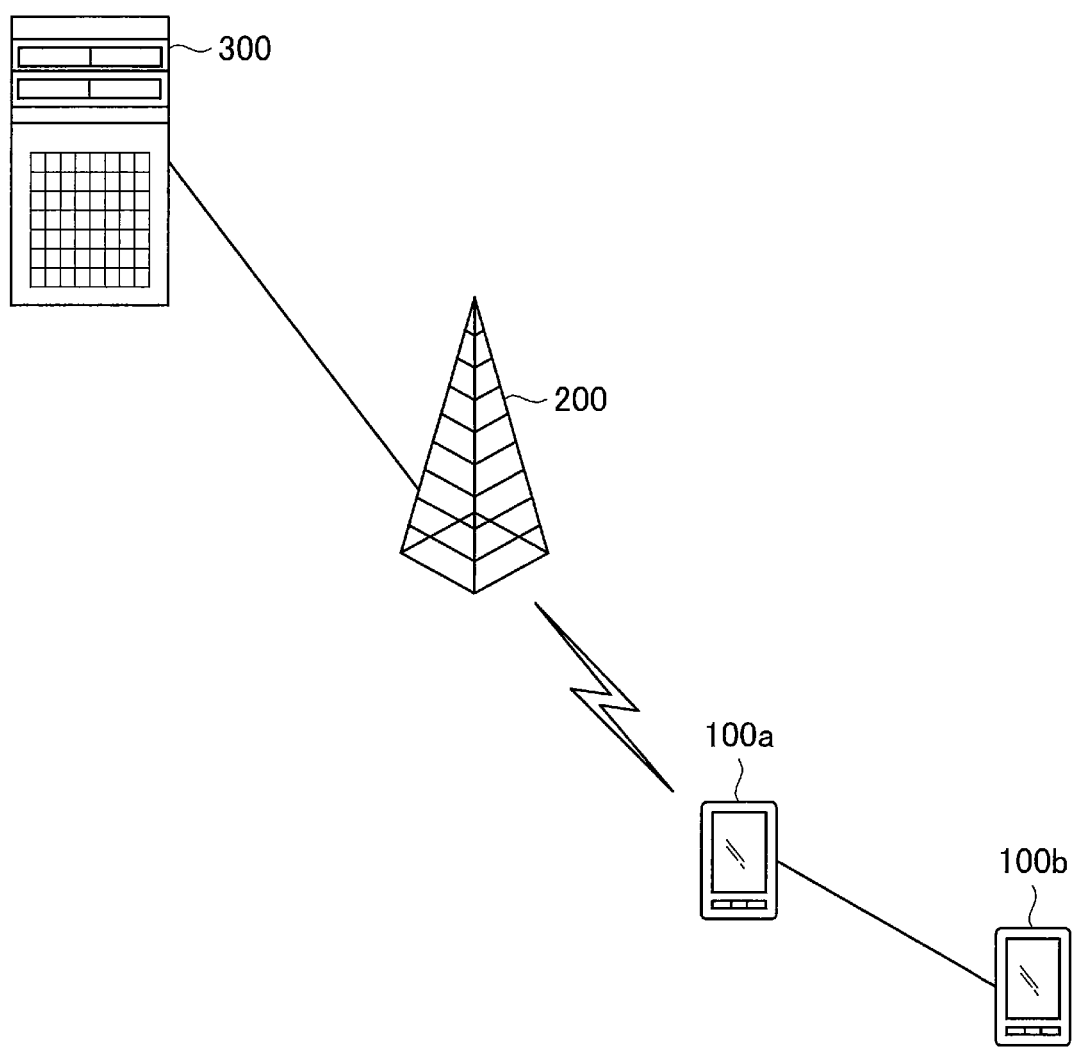
FIG. 7 is an illustrative diagram illustrating an example of the schematic configuration of a communication system 1 according to an embodiment of the present disclosure.

First, a schematic configuration of a communication system 1 according to an embodiment of the present disclosure will be described. FIG. 7 is an illustrative diagram illustrating an example of the schematic configuration of a communication system 1 according to an embodiment of the present disclosure. Referring to FIG. 7, the communication system 1 includes terminal devices 100a and 100b, a base station 200, and a control entity 300. The communication system 1 is a system complying with, for example, LTE, LTE-Advanced, or a communication standard equivalent thereto.

The terminal device 100a performs wireless communication with the base station 200 and the terminal device 100b. In addition, the terminal device 100b performs wireless communication with the base station 200 and the terminal device 100a. The terminal devices 100a and 100b perform intermittent reception operations. The terminal devices 100a and 100b perform DRX operations, for example, in an idle mode. Specifically, the terminal devices 100a and 100b perform, for example, a normal reception operation on an occasion of paging for the terminal devices 100a and 100b, and stop at least a part of the reception operation in other periods. When at least a part of the reception operation stops, for example, the terminal devices 100a and 100b do not supply power to at least some of their circuits relating to the reception operation. Note that the terminal devices 100a and 100b may perform a DRX operation even in a connected mode.

The base station 200 performs wireless communication with one or more terminal devices including the terminal device 100a. The base station 200 may be a base station of a macro cell (i.e., a macro base station) or a base station of a small cell (i.e., a small base station). In addition, the base station 200 performs paging. Specifically, the base station 200 transmits, for example, a paging message destined for a terminal device on an occasion of paging for the terminal device when necessary in each of paging sections that repeatedly exist on a time axis.

The control entity 300 performs control according to each embodiment of the present disclosure. For example, the control entity 300 is an existing or a new core network node. Alternatively, the control entity 300 may be a base station. As an example, in a case where the base station 200 is a small base station, the control entity 300 may be a macro base station.

In the description provided below, the terminal device 100a will be assumed to be a master terminal and the terminal device 100b to be a slave terminal. That is, the terminal device 100a is a UE having a function of a small cell base station, and the terminal devices 100a and 100b constitute a virtual small cell network (LN). In addition, the communication system 1 according to an embodiment of the present disclosure executes a process of paging from the base station 200 to the terminal device 100a, and paging from the base station 200 to the terminal device 100b via the terminal device 100a. Note that, although a case where only one slave terminal is present is illustrated in FIG. 7, the present disclosure is not limited to the case, and a plurality of slave terminals may be present with respect to one master terminal. In addition, the terminal device 100b, which is a slave terminal, may be or may not be present within a coverage range of the base station 200.

In a system in which the terminal device 100a, which is a master terminal, acts like a cell, like the communication system 1 as illustrated in FIG. 7, the terminal device 100a playing a role of a cell as well as the terminal device 100b that is a slave terminal is assumed to be in the idle mode. In the present embodiment, paging is efficiently executed from the base station 200 to the terminal device 100b even in the case where the terminal device 100a and the terminal device 100b are in the idle mode.

The communication system 1 according to the present embodiment executes a process "proxy paging reception" to efficiently execute paging from the base station 200 to the terminal device 100b. The proxy paging reception is a process in which the terminal device 100a that is a master terminal collectively receives paging information transmitted from the base station 200 toward the terminal device 100b that is a slave terminal. The terminal device 100a that receives paging information transmitted toward the terminal device 100b executes a process of paging with respect to the terminal device 100b.

The communication system 1 according to the present embodiment can efficiently execute paging from the base station 200 with respect to the terminal device 100b even in the case where the terminal device 100a and the terminal device 100b are in the idle mode, by adopting the mechanism of proxy paging reception. The mechanism of proxy paging reception will be described below in detail.

The example of the schematic configuration of the communication system 1 according to the embodiment of the present disclosure has been described above using FIG. 7. Next, examples of configurations of the terminal device 100a and the terminal device 100b (which will also be collectively referred to as "terminal devices 100) according to the embodiment of the present disclosure will be described.

(1.2.2. Example of Configuration of Terminal Device)

Figure 8:
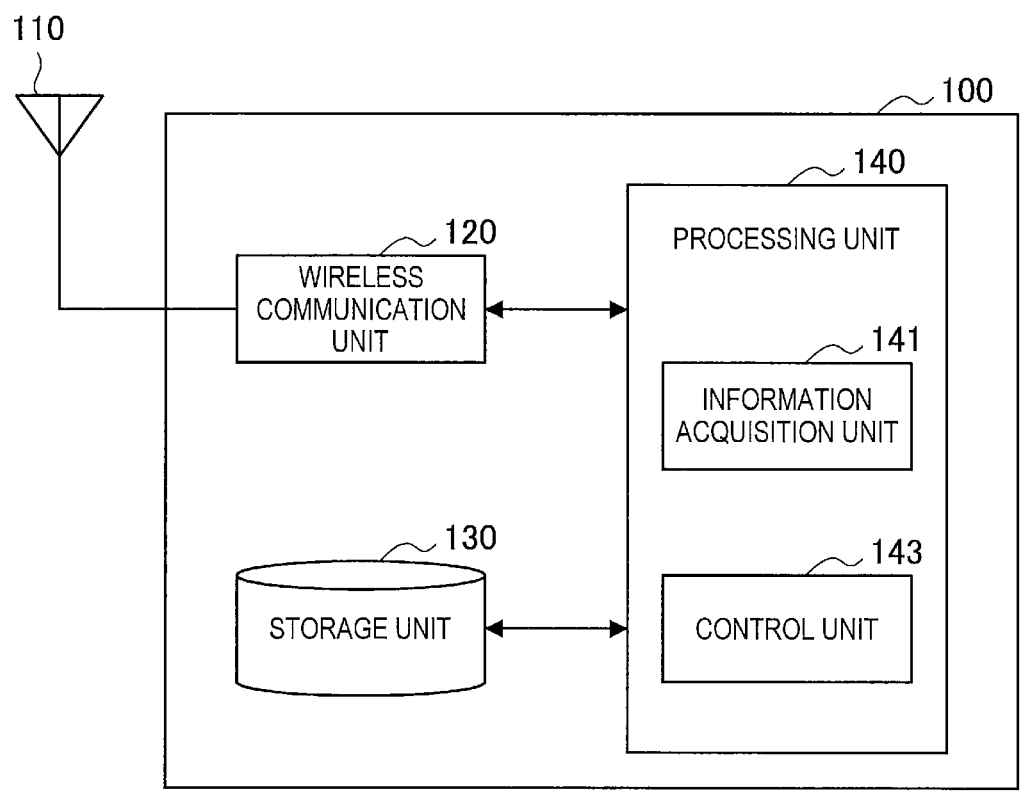
FIG. 8 is a block diagram illustrating an example of a configuration of a terminal device 100 according to the embodiment of the present disclosure.

FIG. 8 is a block diagram illustrating an example of a configuration of the terminal device 100 according to the embodiment of the present disclosure. Referring to FIG. 8, the terminal device 100 includes an antenna unit 110, a wireless communication unit 120, a storage unit 130, and a processing unit 140.

(Antenna Unit 110)

The antenna unit 110 emits a signal output by the wireless communication unit 120 to a space as a radio wave. In addition, the antenna unit 110 converts a radio wave in a space into a signal and outputs the signal to the wireless communication unit 120.

(Wireless Communication Unit 120)

The wireless communication unit 120 receives a signal. For example, the wireless communication unit 120 receives a downlink signal from a base station and transmits an uplink signal to a base station.

(Storage Unit 130)

The storage unit 130 temporarily or permanently stores programs and data for operations of the terminal device 100. In the present embodiment, in a case where the terminal device 100 is a master terminal, the storage unit 130 stores a list of slave terminals. The list of slave terminals stored in the storage unit 130 is used in a process performed by a control unit 143, e.g., a process of prescribing a timing of paging destined for a terminal device that will be described below.

(Processing Unit 140)

The processing unit 140 provides various functions of the terminal device 100. The processing unit 140 includes an information acquisition unit 141 and the control unit 143. Note that the processing unit 140 can further include other constituent elements in addition to these constituent elements. That is, the processing unit 140 can perform other operations in addition to operations of the constituent elements.

(Information Acquisition Unit 141)

The information acquisition unit 141 acquires various kinds of information from signals obtained from radio waves received by the antenna unit 110. In the case where the terminal device 100 is a master terminal in the present embodiment, the information acquisition unit 141 acquires a paging signal destined for the terminal device and a paging signal destined for a slave terminal transmitted from the base station 200. In addition, in a case where the terminal device 100 is a slave terminal, the information acquisition unit 141 acquires a paging signal destined for the slave terminal transmitted from the base station 200 or a master terminal.

(Control Unit 143)

The control unit 143 controls operations of the terminal device 100.

Particularly in the present embodiment, the control unit 143 executes a paging process with the base station 200, or a paging process with a slave terminal in the case where the terminal device 100 is a master terminal. In addition, the control unit 143 executes a paging process with the terminal device 100a or a paging process with a master terminal on the basis of a paging signal destined for a slave terminal transmitted from the master terminal in the case where the terminal device 100 is the slave terminal. The control unit 143 performs a DRX operation, for example, in the idle mode, and receives a paging message transmitted from the base station 200 (or from the terminal device 100a in the case where the terminal device 100 is a slave terminal) through a DRX operation.

In the case where the terminal device 100 is a master terminal, the control unit 143 executes a process of prescribing a timing of paging that is destined for a slave terminal. In an existing paging process, a paging file is specified on the basis of an ID of a terminal. If the mechanism of the existing paging process is applied to a paging process for a slave terminal, however, both the master terminal and the slave terminal individually allocate paging files, which deteriorates efficiency. In particular, in a case where the master terminal performs proxy paging reception, the master terminal also has to read a paging massage for the slave terminal, and thus an efficient mechanism in which paging messages for the slave terminal can be collectively received is demanded.

Thus, the present embodiment prescribes a new timing of paging (PF/PO) destined for a slave terminal which belongs to a master terminal, and the control unit 143 determines a timing of paging destined for the slave terminal that belongs to the master terminal. The control unit 143 may set, for example, the same timing of paging for all slave terminals, differentiate POs but set the same PF for all of the slave terminals, or differentiate PFs for all of the slave terminals. Since the control unit 143 determines a timing of paging destined for the slave terminal that belongs to the master terminal, the terminal device 100 that is the master terminal can efficiently execute paging with respect to the slave terminal. Note that the timing of paging destined for the slave terminal that belongs to the master terminal may be determined by the base station 200 rather than the terminal device 100 that is the master terminal. In a case where the base station 200 determines a timing of paging destined for the slave terminal that belongs to the master terminal, the control unit 143 transmits information for identifying the master terminal and information for identifying the slave terminal to the base station 200.

The example of the functional configuration of the terminal device 100 according to an embodiment of the present disclosure has been described above. Next, an example of a functional configuration of the base station 200 according to an embodiment of the present disclosure will be described.

(1.2.3. Example of Configuration of Base Station)

Figure 9:
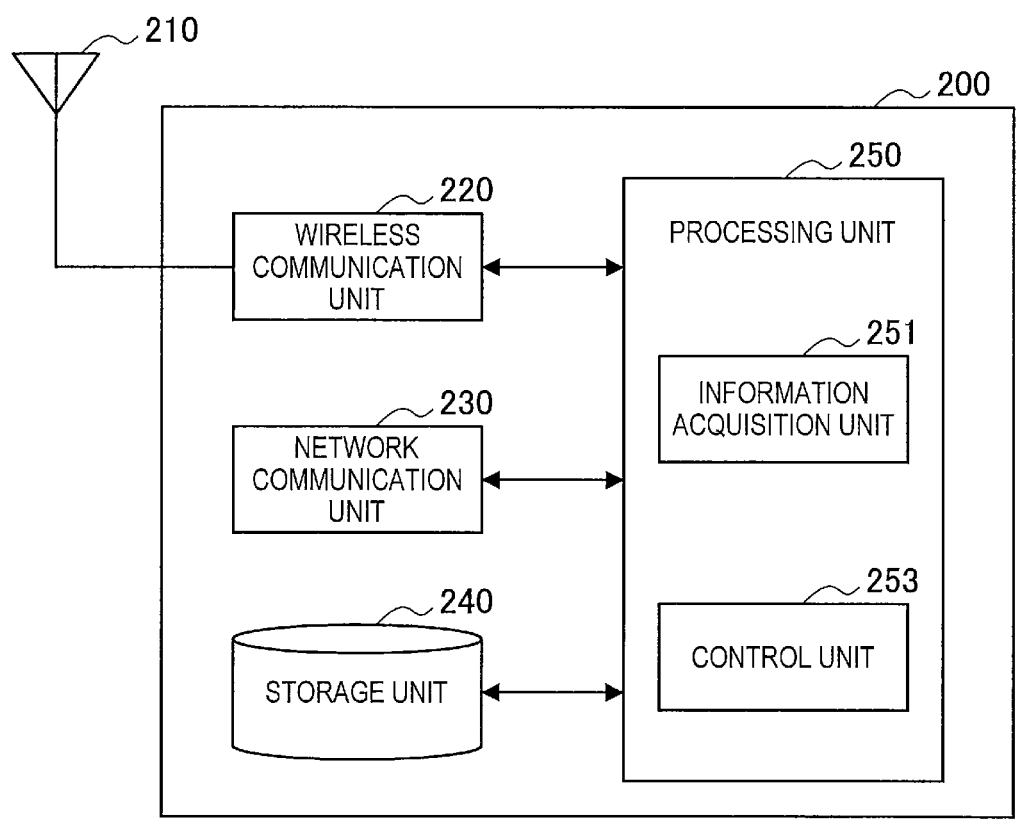
FIG. 9 is a block diagram illustrating an example of a functional configuration of a base station 200 according to an embodiment of the present disclosure.

FIG. 9 is a block diagram illustrating an example of a functional configuration of the base station 200 according to an embodiment of the present disclosure. As illustrated in FIG. 9, the base station 200 according to the embodiment of the present disclosure includes an antenna unit 210, a wireless communication unit 220, a network communication unit 230, a storage unit 240, and a processing unit 250.

(Antenna Unit 210)

The antenna unit 210 emits a signal output by the wireless communication unit 220 to a space as a radio wave. In addition, the antenna unit 210 converts a radio wave of a space into a signal and outputs the signal to the wireless communication unit 220.

(Wireless Communication Unit 220)

The wireless communication unit 220 transmits and receives signals. For example, the wireless communication unit 220 transmits a downlink signal to a terminal device and receives an uplink signal from a terminal device.

(Network Communication Unit 230)

The network communication unit 230 transmits and receives information. For example, the network communication unit 230 transmits information to another node and receives information from another node. The other node includes, for example, a core network and another base station. The other node includes the control entity 300 as an example.

(Storage Unit 240)

The storage unit 240 temporarily or permanently stores programs and data that are necessary for operations of the base station 200.

(Processing Unit 250)

The processing unit 250 provides various functions of the base station 200. The processing unit 250 includes the information acquisition unit 251 and the control unit 253. Note that the processing unit 250 can further include other constituent elements in addition to these constituent elements. That is, the processing unit 250 can perform other operations in addition to operations of the constituent elements.

(Information Acquisition Unit 251)

The information acquisition unit 251 acquires information or programs for operations of the base station 200 or information received from another node. The information acquisition unit 251 can acquire information or programs for operations of the base station 200 from the storage unit 240. In the present embodiment, the information acquisition unit 251 acquires a paging signal for S1AP: Paging transmitted from the control entity 300.

(Control Unit 253)

The control unit 253 controls operations of the base station 200. In the present embodiment, the control unit 253 performs paging with respect to a terminal device. For example, the control unit 253 generates a paging message transmitted on each occasion of paging. The paging message transmitted on each occasion of paging is a paging message destined for a terminal device for the occasion of paging. In addition, the control unit 253 transmits the generated paging message via the wireless communication unit 220 on each occasion of paging. The control unit 253 generates a paging signal for, for example, RRC: paging with respect to the terminal device 100a and causes the paging signal for RRC: paging to be output from the antenna unit 210 via the wireless communication unit 220.

In addition, in a case where it is necessary for a terminal device to re-acquire system information, for example, the control unit 253 performs paging with respect to the terminal device. Further, the control unit 253 performs paging with respect to a terminal device in accordance with a request from another device. The other device is, for example, a core network node (e.g., the control entity 300), and the request is a paging message (e.g., an S1AP paging message) from the other device.

The control unit 253 may set a timing of paging destined for the slave terminal that belongs to the master terminal to a timing determined by the control unit 143 of the above-described terminal device 100. In addition, the control unit 253 may execute the process of determining a timing of paging destined for the slave terminal that belongs to the master terminal, which may be executed by the control unit 143 of the above-described terminal device 100. When the control unit 253 determines a timing of paging destined for the slave terminal that belongs to the master terminal, the information acquisition unit 251 may acquire the information for identifying the master terminal and the information for identifying the slave terminal from the terminal device 100 that is the master terminal.

The example of the functional configuration of the base station 200 according to an embodiment of the present disclosure has been described above. Next, an example of a functional configuration of the control entity 300 according to an embodiment of the present disclosure will be described.

(1.2.4. Example of Configuration of Control Entity)

Figure 10:
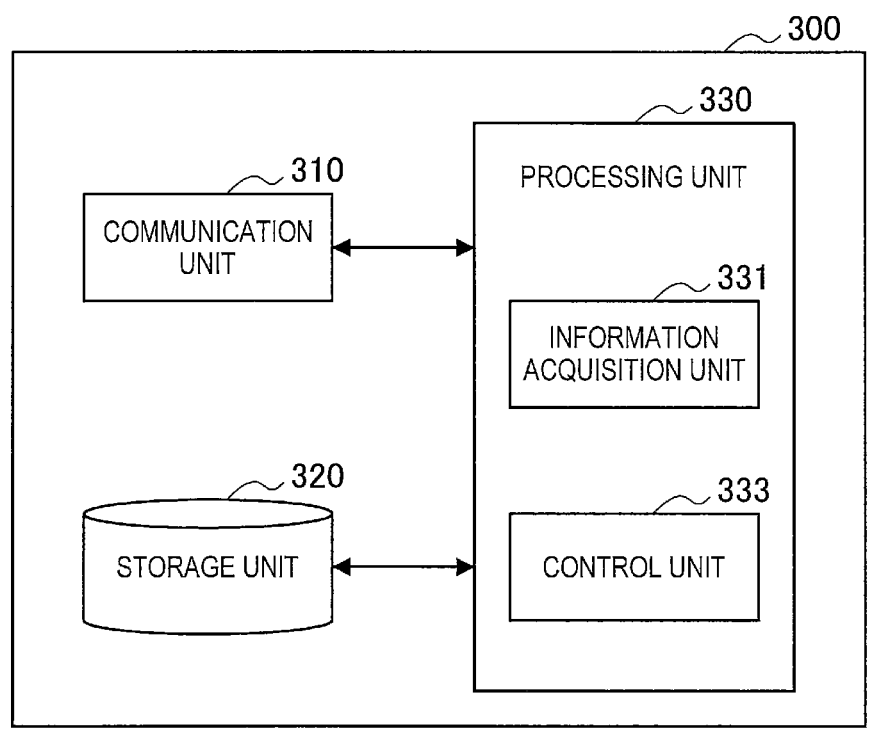
FIG. 10 is a block diagram illustrating an example of a functional configuration of a control entity 300 according to an embodiment of the present disclosure.

FIG. 10 is a block diagram illustrating an example of a functional configuration of the control entity 300 according to an embodiment of the present disclosure. As illustrated in FIG. 10, the control entity 300 according to the embodiment of the present disclosure includes a communication unit 310, a storage unit 320, and a processing unit 330.

(Communication Unit 310)

The communication unit 310 transmits and receives information. For example, the communication unit 310 transmits information to another node and receives information from another node. The other node includes, for example, a core network and a base station. The other node includes the base station 200 as an example.

(Storage Unit 320)

The storage unit 320 temporarily and permanently stores programs and data that are necessary for operations of the control entity 300.

(Processing Unit 330)

The processing unit 330 provides various functions of the control entity 300. The processing unit 330 includes an information acquisition unit 331 and a control unit 333. Note that the processing unit 330 can further include other constituent elements in addition to these constituent elements. That is, the processing unit 330 can perform other operations in addition to operations of the constituent elements.

(Information Acquisition Unit 331)

The information acquisition unit 331 acquires information for operations of the control entity 300 and information received from another node. The information acquisition unit 331 can acquire information and programs for operations of the control entity 300 from the storage unit 320.

(Control Unit 333)

The control unit 333 controls operations of the control entity 300. The control unit 333 can operate on the basis of information acquired by the information acquisition unit 331. In the present embodiment, the control unit 333 generates a paging signal for S1AP: Paging with respect to the base station 200, and causes the paging signal for S1AP: Paging to be output at a predetermined timing from the communication unit 310.

The example of the functional configuration of the control entity 300 according to an embodiment of the present disclosure has been described above. Next, an example of an operation of the communication system 1 according to an embodiment of the present disclosure will be described.

(1.3. Example of Operation)

FIG. 11 is an illustrative diagram illustrating a combination of statuses of a paging destination, a master terminal, and a slave terminal that are assumed in a case of downlink in the communication system 1 according to an embodiment of the present disclosure. In a case where the communication system 1 is configured as illustrated in FIG. 7, there are 5 combinations of the paging destination, the master terminal, and the slave terminal shown in FIG. 11 that are assumed in the case of downlink.

An existing paging process of LTE is used in Case 1 where the paging destination is the master terminal. Thus, the process of Case 1 is not described in this embodiment.

Next, Case 3 where the master terminal is in the idle mode and the slave terminal is in an RRC connected state with the base station among Cases 2 to 4 where the paging destination is the slave terminal is not described herein. The reason for this is that the slave terminal can directly communicate with the base station in the case where the slave terminal is in the RRC connected state with the base station.

Thus, Case 2 where both the master terminal and the slave terminal are in the idle mode, Case 4 where the master terminal is in the RRC connected state and the slave terminal is in the idle mode and Case 5 where both the master terminal and the slave terminal are in the RRC connected state will be discussed below.

First, with respect to Case 2 where both the master terminal and the slave terminal are in the idle mode, an efficient mechanism for performing paging with respect to the slave terminal being in the idle mode via the master terminal being in the idle mode will be described.

Figure 12:
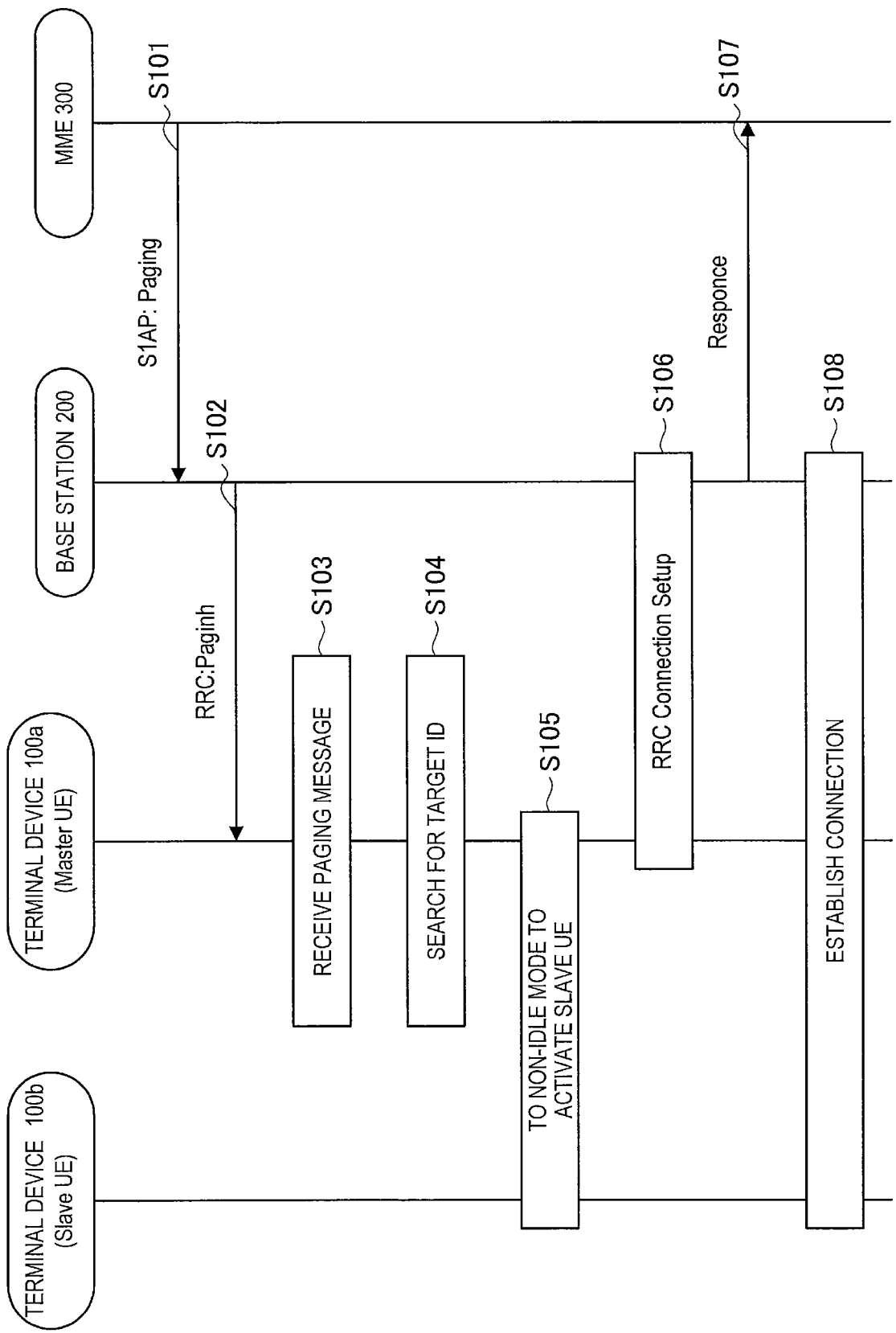
FIG. 12 is a sequence diagram showing an example of an operation of a communication system 1 according to an embodiment of the present disclosure.

FIG. 12 is a sequence diagram showing an example of an operation of the communication system 1 according to an embodiment of the present disclosure. FIG. 12 shows an example of an operation in which the control entity 300 transmits a paging message to the terminal device 100b (the slave terminal) being in the idle mode to establish a connection. The example of the operation of the communication system 1 according to the embodiment of the present disclosure will be described below using FIG. 12.

First, it is assumed as a premise that the terminal device 100a (a master terminal) and the terminal device 100b (a slave terminal) are in the idle mode when the operation starts.

The control entity 300 transmits an S1AP: paging message to the base station 200 that is in a target TA (Step S101). The process of Step S101 can be executed by, for example, the control unit 333.

The base station 200 that has received the S1AP: paging message from the control entity 300 notifies the terminal device 100a of an RRC: paging message on the basis of the received S1AP: paging message (Step S102). The process of Step S102 can be executed by, for example, the control unit 253.

When the wireless communication unit 120 receives the RRC: paging message from the base station 200 via the antenna unit 110 (Step S103), the terminal device 100a checks a terminal ID included in the RRC: paging message and searches for a target ID (Step S104). The process of Step S104 can be executed by, for example, the control unit 143. A list of slave terminals held by the terminal device 100a in advance is used in the process of searching for the target ID in Step S104.

When the terminal device 100a discovers the same ID as the terminal ID included in the RRC: paging message from the held list of slave terminals, the terminal device establishes a connection with the terminal device 100b (Step S105) and establishes a connection with the base station 200 (Step S106). The processes of Steps S105 and S106 can be executed by, for example, the control unit 143. The order of Step S105 and Step S106 may be reversed. Since the terminal device 100a establishes the connection with the terminal device 100b, the terminal device 100b transitions from the idle mode to a non-idle mode.

A method of the terminal device 100a to cause the terminal device 100b to transition from the idle mode to the non-idle mode includes, for example, the following method.

For example, a new paging mechanism is provided between the terminal device 100a and the terminal device 100b. In the present embodiment, paging between the terminal device 100a and the terminal device 100b refers to "access link (AL) paging." AL paging is to give a notification from the terminal device 100a to the terminal device 100b by applying the existing paging process. AL paging may enable the terminal device 100a to cause the terminal device 100b to transition from an idle mode to a non-idle mode.

In addition, a master-slave paging time should be considered for paging toward the slave terminal via the master terminal, and a time may be insufficient if the existing timer T3413 is used.

Thus, the present embodiment prescribes a new timer for a slave terminal that belongs to a master terminal. A time is prescribed for the new timer by considering a master-slave connection setup time in addition to the time of the existing timer T3413.

When the terminal device 100a establishes a connection between the terminal device 100b and the base station 200, the base station 200 replies to the control entity 300 with a response message (Step S107). The reply of the response message of Step S107 can be executed by, for example, the control unit 253. The connection between the base station 200 and the terminal device 100a and terminal device 100b is established with the reply of the response message of Step S107 (Step S108).

Note that, if the same ID as the terminal ID included in the RRC: paging message is not discovered on the held list of slave terminals in the process of searching for the target ID of Step S104, the terminal device 100a does not perform the succeeding processes.

In a case where both the master terminal and the slave terminal are in the idle mode in the communication system 1 according to an embodiment of the present disclosure, the master terminal first receives the paging message that is originally transmitted toward the slave terminal, then the master terminal causes the slave terminal to transition to the non-idle mode by executing the above-described series of operations, and thereby the paging process from the control entity 300 to the slave terminal can be performed.

A paging file is specified on the basis of an ID of a terminal in the existing paging process. If the mechanism of the existing paging process is applied to the paging process for the slave terminal, however, both the master terminal and the slave terminal individually allocate paging files, which deteriorates efficiency. In particular, in a case where the master terminal performs proxy paging reception, the master terminal also has to read a paging massage for the slave terminal, and thus an efficient mechanism in which paging messages for the slave terminal can be collectively received is demanded.

Thus, the present embodiment prescribes a new timing of paging (PF/PO) destined for the slave terminal which belongs to the master terminal. The timing of paging for the slave terminal that belongs to the master terminal is called a proxy paging reception timing (PPRT).

Figure 13:
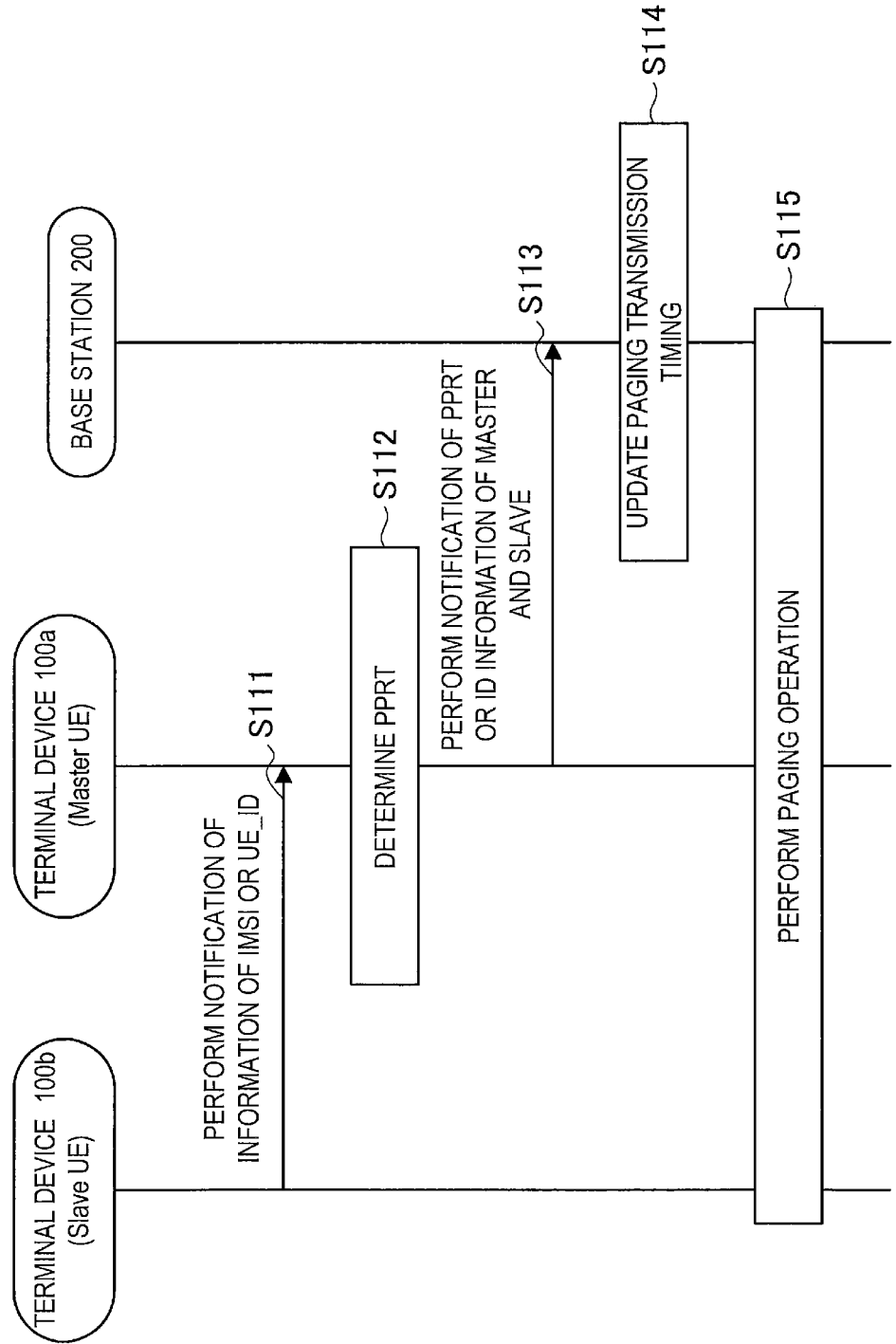
FIG. 13 is a sequence diagram showing an example of an operation of a communication system 1 according to an embodiment of the present disclosure.

FIG. 13 is a sequence diagram showing an example of an operation of the communication system 1 according to an embodiment of the present disclosure. FIG. 13 is of an example of an operation in which a PPRT is set when a paging message is transmitted from the base station 200 to the terminal device 100b. The example of the operation of the communication system 1 according to an embodiment of the present disclosure will be described below using FIG. 13.

The terminal device 100b notifies the terminal device 100a of information of an IMSI or UE_ID when the terminal device belongs to the terminal device 100a (Step S111). The process of Step S111 can be performed by, for example, the control unit 143.

When the terminal device 100b belongs to a network of the terminal device 100a and the terminal device 100a receives the information of the IMSI or UE_ID from the terminal device 100b, the terminal device 100a determines a PPRT using the received information (Step S112). The process of Step S112 can be executed by, for example, the control unit 143. In a case where the terminal device 100a executes proxy paging reception, the terminal device 100a collectively receives a paging message destined for the terminal device 100b from the base station 200 on the basis of the PPRT determined in Step S112.

The process of determining the PPRT in Step S112 will be described. In a case where the PPRT is determined with reference to an ID of the master terminal, for example, the terminal device 100a may set the PPRT to the same timing of paging (a PF or a PO) for all slave terminals, set the PPRT to the same PF for all of the slave terminals while differentiating POs, or set different PFs for all of the slave terminals.

In a case where the same timing of paging (PF or PO) is set for all of the slave terminals, for example, the terminal device 100a determines a timing that is a PF an arbitrary offset amount later from the PF of the terminal device 100a that is the master terminal which is the same subframe as that of the terminal device 100a to be a paging timing. It is desirable for the paging timing of the slave terminal to be immediately after the PF of the terminal device 100a that is the master terminal.

In the case where POs are differentiated although the same PF is set for all of the slave terminals, for example, the terminal device 100a determines a timing to, for example, a subframe an arbitrary offset amount later from the PF of the terminal device 100a that is the master terminal. In addition, in the case where POs are differentiated although the same PF is set for all of the slave terminals, the terminal device 100a separates the POs by IDs of the slave terminals (Slave ID). For example, the terminal device 100a may determine a PO of a slave terminal using the following formula.

$$PO = (\text{Slave ID}) \bmod (\text{the number of PO candidates})$$

In a case where different PFs are set for the slave terminals, for example, the terminal device 100a allocates a pool of PFs for the slave terminals. The terminal device 100a allocates the pool of PFs using an offset value calculated using the IDs of the slave terminals.

The terminal device 100a allocates, for example, the pool to a number of subframes that are immediately after the PF of the terminal device 100a that is the master terminal and allocates the PF of the slave terminal within the allocated pool. The terminal device 100a may determine the PF of the slave terminal using the following formula.

$$PF = (\text{slave ID}) \bmod (\text{size of pool})$$

Note that the PPRT may be determined by the terminal device 100a using the above-described method, i.e., using a cycle of PF of the terminal device 100a that is the master terminal.

When the PPRT is determined in Step S112, the terminal device 100a notifies the base station 20 of the determined PPRT to cause the base station 200 to update a transmission timing of a paging message (Step S113). The process of Step S113 can be executed by, for example, the control unit 143.

When the PPRT is received from the terminal device 100a, the base station 200 updates the transmission timing of the paging message on the basis of the received PPRT (Step S114). The process of Step S114 can be executed by, for example the control unit 253. Then, the base station 200 executes a paging operation with respect to the terminal devices 100a and 100b (Step S115). The process of Step S115 can be executed by, for example, the control unit 253.

The terminal device 100a that is the master terminal determines a paging timing toward the slave terminal that belongs to the master terminal using the IMSI or UE_ID acquired from the terminal device 100b that is a slave terminal, notifies the base station 200 of the determined paging timing, and thereby can collectively receive paging messages for the slave terminal.

Although the terminal device 100a that is the master terminal determines the PPRT in the above-described example, the present disclosure is not limited thereto.

The PPRT may be determined by the base station 200. In a case where the base station 200 determines a PPRT, the terminal device 100a may notify the base station 200 of information of an IMSI or UE_ID acquired from the terminal device 100b that is a slave terminal and information of an IMSI or UE_ID of the terminal device 100a that is the master terminal, rather than determining a PPRT. The base station 200 determines a PPRT using the information of the IMSI or UE_ID acquired from the terminal device 100a that is the master terminal and the information of the IMSI or UE_ID of the terminal device 100b that is a slave terminal.

In Case 4 of FIG. 11, it is necessary for the master terminal that is in the RRC connected state with respect to the base station to receive a paging signal destined for the slave terminal that is in the idle mode on behalf thereof. Thus, it is desirable for the master terminal that is in the RRC connected state with respect to the base station to surely obtain information of paging that is destined for the slave terminal. The present embodiment proposes the following two techniques for the master terminal to surely obtain information of paging destined for the slave terminal.

(Technique 1)

A first technique is to newly prescribe information of paging destined for the slave terminal in information of paging destined for the master terminal. In addition, information for the master terminal to surely obtain the information of paging destined for the slave terminal is also prescribed in the S1AP: paging message. By newly defining the information of paging destined for the slave terminal in the information of paging destined for the master terminal, the master terminal can clearly determine whether a received message is a message destined for itself or for the slave terminal that belongs to itself.

FIG. 14 is an illustrative diagram illustrating a structure of the S1AP: paging message that has already been stipulated on the LTE platform. In the present embodiment, two pieces of information are added to the S1AP: paging message. One is a parameter for determining whether the S1AP: paging message is directly transmitted from the base station or transmitted via the master terminal, and this parameter is called "UE virtual cell parameter" in the present embodiment. The other one is a list of information (virtual cell ID) for identifying the master terminal of which a range is likely to include a target slave terminal, and this list of information is called "list of UE virtual cell identities" in the present embodiment.

The MME 300 transmits the S1AP: paging message to which the above-described "UE virtual cell parameter" and "list of UE virtual cell identities" are added to the base station 200.

FIG. 15 is an illustrative diagram illustrating a structure of the RRC: paging message that has already been stipulated on the LTE platform. In the present embodiment, two pieces of information are added to the RRC: paging message. One is the above-described "UE virtual cell parameter," and the other one is the above-described "list of UE virtual cell identities."

The base station 200 transmits the RRC: paging message to which the above-described "UE virtual cell parameter" and "list of UE virtual cell identities" are added to the terminal device 100a. By receiving the paging message to which the above-described "UE virtual cell parameter" and "list of UE virtual cell identities" are added, the terminal device 100a can clearly determine whether the received message is a message destined for itself or a message destined for the slave terminal that belongs to itself.

Note that the above-described two pieces of information may be added to a BH: paging message, rather than the RRC: paging message.

In addition, the present embodiment stipulates parameters that are necessary for the terminal device 100a to receive an AL: paging message that is for performing paging between the terminal device 100a and the terminal device 100b as follows. Note that the terminal device 100a responds to the AL: paging message by transferring an RRC: paging message.

Paging Frame Update

To provide a value of a PF after rewriting or an offset value.

Information of Paging of Master Terminal

Information that serves as a base of a slave terminal which corresponds to, for example, a PF of the terminal device 100a that is the master terminal, a terminal ID of the terminal device 100a, etc.

By newly defining the information of paging destined for the slave terminal in the information of paging destined for the master terminal as described above, the terminal device 100a that is the master terminal can clearly determine whether a received message is a message destined for itself or a message destined for the slave terminal that belongs to itself (Technique 2)

A second technique is to notify the master terminal of the information of paging destined for the slave terminal, using a method different from paging. The master terminal that is in the RRC connected state with respect to the base station does not necessarily decode the information of paging for certain each time of a PO. In this case, a mechanism for notifying the master terminal that is in the RRC connected state with respect to the base station of the information of paging destined for the slave terminal using a method different from paging is desirable. Notification methods may include, for example, notification via a PDCCH, notification via a PDSCH, and the like By notifying the master terminal that is in the RRC connected state with respect to the base station of the information of paging destined for the slave terminal using a method different from paging, the master terminal can certainly acquire a message destined for the slave terminal that belongs to itself.

Note that the above-described two methods can also be applied to Case 2, i.e., the case where both the master terminal and the slave terminal are in the idle mode, as well as Case 4 of FIG. 11. That is, when the terminal device 100a in the idle mode receives paging from the base station 200 and thus shifts to an RRC connected state, the terminal device 100a transitions to the state of Case 4 of FIG. 11, and thus the terminal device 100a can receive a paging message destined for the terminal device 100b in that way.

2. APPLICATION EXAMPLES

The technology of the present disclosure can be applied to various products. For example, the control entity 300 may be realized as a server of any type such as a tower server, a rack server, a blade server, or the like. In addition, the control entity 300 may be a control module mounted in a server (e.g., an integrated circuit module configured in one die or a card or a blade inserted into a slot of a blade server).

Further, the base station 200 may be realized as any type of evolved node B (eNB), for example, a macro eNB, a small eNB, or the like. A small eNB may be an eNB that covers a smaller cell than a macro cell, such as a pico eNB, a micro eNB, or a home (femto) eNB. Alternatively, the base station 200 may be realized as another type of base station such as a node B or a base transceiver station (BTS). The base station 200 may include a main body that controls radio communication (also referred to as a base station device) and one or more remote radio heads (RRHs) disposed in a different place from the main body. In addition, various types of terminals to be described below may operate as the base station 200 by temporarily or semi-permanently executing the base station function.

In addition, the terminal devices 100a and 100b may each be realized as, for example, a mobile terminal such as a smartphone, a tablet personal computer (PC), a notebook PC, a portable game terminal, a portable/dongle type mobile router, or a digital camera, or an in-vehicle terminal such as a car navigation device. In addition, the terminal devices 100a and 100b may each be realized as a terminal that performs machine-to-machine (M2M) communication (also referred to as a machine type communication (MTC) terminal). Furthermore, the terminal devices 100a and 100b may each be a wireless communication module mounted in such a terminal (for example, an integrated circuit module configured in one die).

[2-1. Application Example with Regard to Control Entity]

Figure 16:
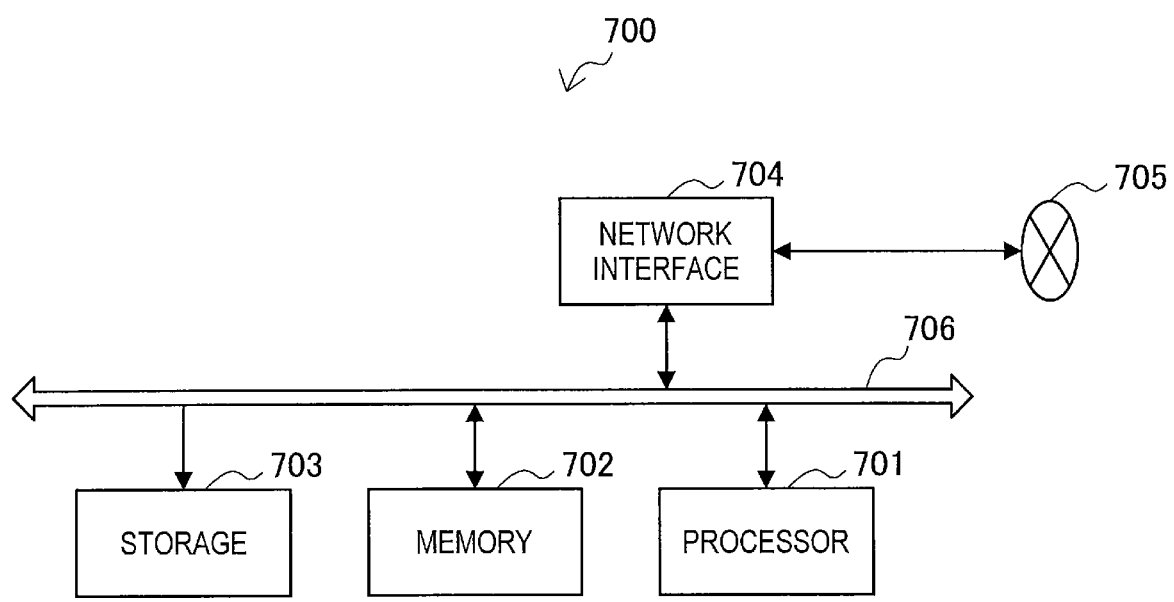
FIG. 16 is a block diagram illustrating an example of a schematic configuration of a server 700 to which the technology of the present disclosure may be applied.

FIG. 16 is a block diagram illustrating an example of a schematic configuration of a server 700 to which the technology of the present disclosure may be applied. The server 700 includes a processor 701, a memory 702, a storage 703, a network interface 704, and a bus 706.

The processor 701 may be, for example, a central processing unit (CPU) or a digital signal processor (DSP) and controls various functions of the server 700. The memory 702 includes a random access memory (RAM) and a read only memory (ROM) and stores programs executed by the processor 701 and data. The storage 703 can include a storage medium such as a semiconductor memory or a hard disk.

The network interface 704 is a wired communication interface for connecting the server 700 to a wired communication network 705. The wired communication network 705 may be a core network such as an evolved packet core (EPC) or a packet data network (PDN) such as the Internet.

The bus 706 connects the processor 701, the memory 702, the storage 703, and the network interface 704 to each other. The bus 706 may include two or more buses that operate at different speeds (e.g., a high-speed bus and a low-speed bus).

In the server 700 illustrated in FIG. 16, one or more constituent elements included in the processing unit 330 described with reference to FIG. 10 (the information acquisition unit 331 and/or the control unit 333) may be implemented by the processor 701. As an example, a program for causing a processor to function as the one or more constituent elements (i.e., a program for causing a processor to execute operations of the one or more constituent elements) may be installed in the server 700 and the processor 701 may execute the program. As another example, a module including the processor 701 and the memory 702 may be mounted in the server 700 and the one or more constituent elements may be implemented by the module. In this case, the module may store a program for causing a processor to function as the one or more constituent elements in the memory 702 and the program may be executed by the processor 701. The server 700 or the module may be provided as devices having the above-described one or more constituent elements as described above, or the program for causing a processor to function as the one or more constituent elements may be provided. In addition, a readable recording medium in which the program is recorded may be provided.

[2-2. Application Example with Regard to Base Station>

First Application Example

Figure 17:
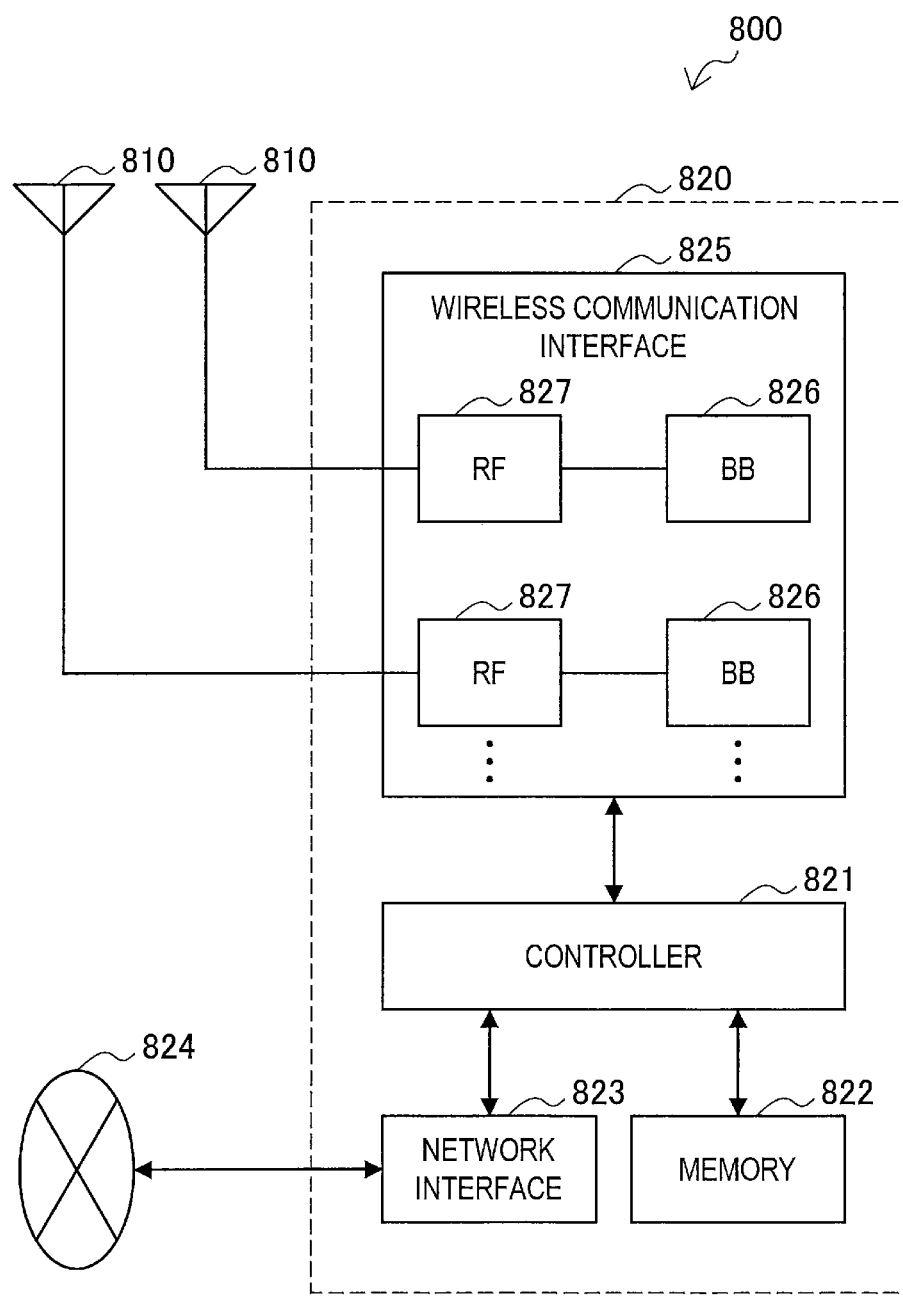
FIG. 17 is a block diagram illustrating a first example of a schematic configuration of an eNB to which the technology of the present disclosure may be applied.

FIG. 17 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 17. For example, the multiple antennas 810 may be compatible with multiple frequency bands used by the eNB 800. Although FIG. 17 illustrates the example in which the eNB 800 includes the multiple antennas 810, the eNB 800 may also include a single antenna 810.

The base station device 820 includes a controller 821, a memory 822, a network interface 823, and a wireless communication interface 825.

The controller 821 may be, for example, a CPU or a DSP, and operates various functions of a higher layer of the base station device 820. For example, the controller 821 generates a data packet from data in signals processed by the wireless communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In this case, the eNB 800 may be connected to a core network node or another eNB through a logical interface (e.g. S1 interface or X2 interface). The network interface 823 may also be a wired communication interface or a wireless communication interface for wireless backhaul. If the network interface 823 is a wireless communication interface, the network interface 823 may use a higher frequency band for wireless communication than a frequency band used by the wireless communication interface 825.

The wireless communication interface 825 supports any cellular communication scheme such as Long Term Evolution (LTE) and LTE-Advanced, and provides radio connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The wireless communication interface 825 may include the multiple BB processors 826, as illustrated in FIG. 17. For example, the multiple BB processors 826 may be compatible with multiple frequency bands used by the eNB 800. The wireless communication interface 825 may include the multiple RF circuits 827, as illustrated in FIG. 17. For example, the multiple RF circuits 827 may be compatible with multiple antenna elements. Although FIG. 17 illustrates the example in which the wireless communication interface 825 includes the multiple BB processors 826 and the multiple RF circuits 827, the wireless communication interface 825 may also include a single BB processor 826 or a single RF circuit 827.

Second Application Example

Figure 18:
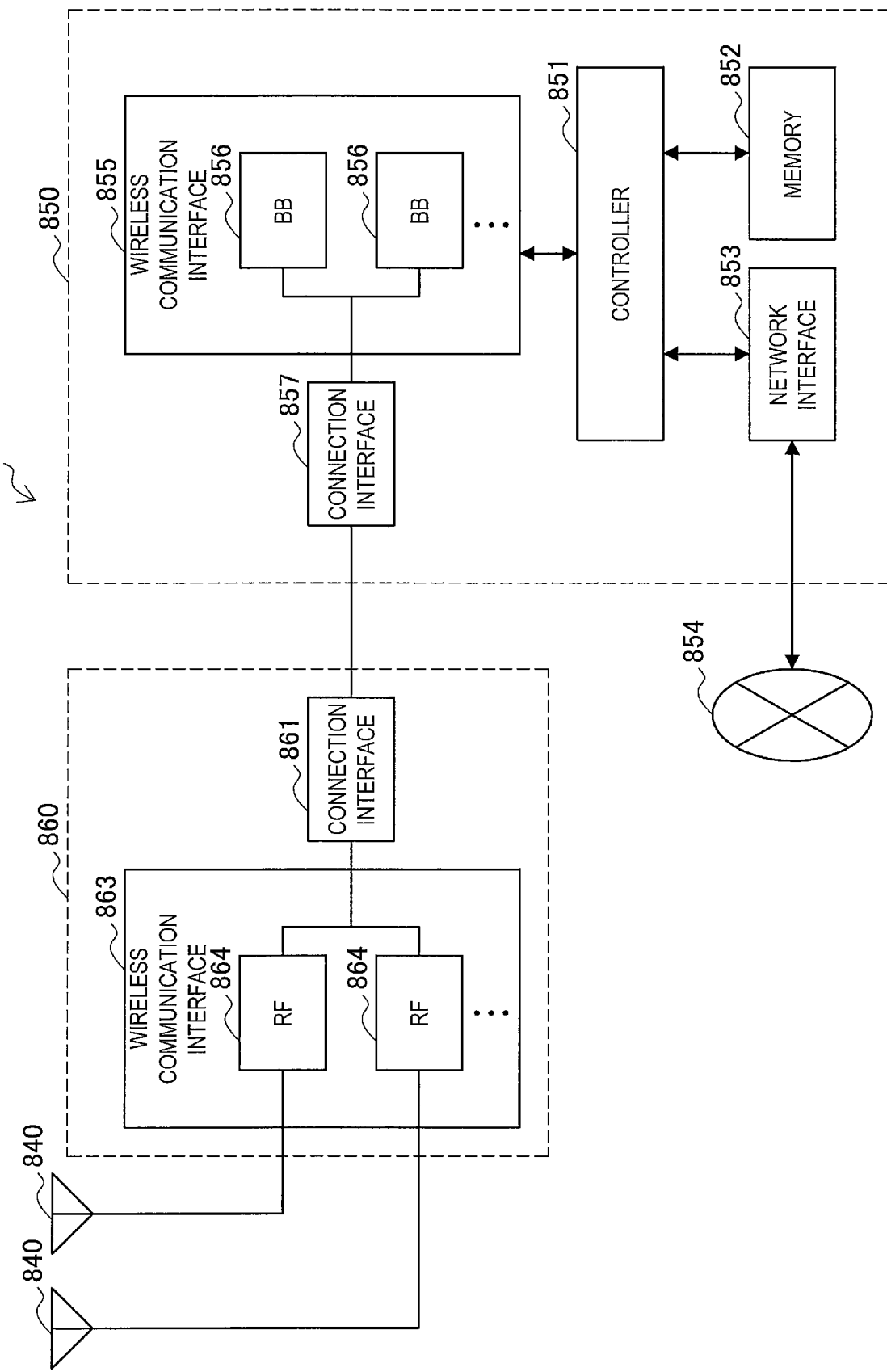
FIG. 18 is a block diagram illustrating a second example of the schematic configuration of the eNB to which the technology of the present disclosure may be applied.

FIG. 18 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 18. For example, the multiple antennas 840 may be compatible with multiple frequency bands used by the eNB 830. Although FIG. 18 illustrates the example in which the eNB 830 includes the multiple antennas 840, the eNB 830 may also include a single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 17.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 17, except the BB processor 856 is connected to the RF circuit 864 of the RRH 860 via the connection interface 857. The wireless communication interface 855 may include the multiple BB processors 856, as illustrated in FIG. 18. For example, the multiple BB processors 856 may be compatible with multiple frequency bands used by the eNB 830. Although FIG. 18 illustrates the example in which the wireless communication interface 855 includes the multiple BB processors 856, the wireless communication interface 855 may also include a single BB processor 856.

The connection interface 857 is an interface for connecting the base station device 850 (wireless communication interface 855) to the RRH 860. The connection interface 857 may also be a communication module for communication in the above-described high speed line that connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-described high speed line.

The wireless communication interface 863 transmits and receives radio signals via the antenna 840. The wireless communication interface 863 may typically include, for example, the RF circuit 864. The RF circuit 864 may include, for example, a mixer, a filter, and an amplifier, and transmits and receives radio signals via the antenna 840. The wireless communication interface 863 may include multiple RF circuits 864, as illustrated in FIG. 18. For example, the multiple RF circuits 864 may support multiple antenna elements. Although FIG. 18 illustrates the example in which the wireless communication interface 863 includes the multiple RF circuits 864, the wireless communication interface 863 may also include a single RF circuit 864.

In the eNB 800 and the eNB 830 shown in FIGS. 17 and 18, one or more constituent elements included in the processing unit 250 (the information acquisition unit 251 and/or the control unit 253) described with reference to FIG. 9 may be implemented by the wireless communication interface 855 and/or the wireless communication interface 863. Alternatively, at least some of these constituent elements may be implemented by the controller 851. As an example, a module which includes a part (for example, the BB processor 856) or all of the wireless communication interface 855 and/or the controller 851 may be mounted in eNB 830, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the one or more constituent elements may be installed in the eNB 830, and the wireless communication interface 855 (for example, the BB processor 856) and/or the controller 851 may execute the program. As described above, the eNB 830, the base station device 850, or the module may be provided as a device which includes the one or more constituent elements, and the program for causing the processor to function as the one or more constituent elements may be provided. In addition, a readable recording medium in which the program is recorded may be provided.

In addition, in the eNB 830 shown in FIG. 18, the wireless communication unit 220 described, for example, with reference to FIG. 9 may be implemented by the wireless communication interface 863 (for example, the RF circuit 864). Moreover, the antenna unit 210 may be implemented by the antenna 840. In addition, the network communication unit 230 may be implemented by the controller 851 and/or the network interface 853.

[2-3. Application Example with Regard to Terminal Device]

First Application Example

Figure 19:
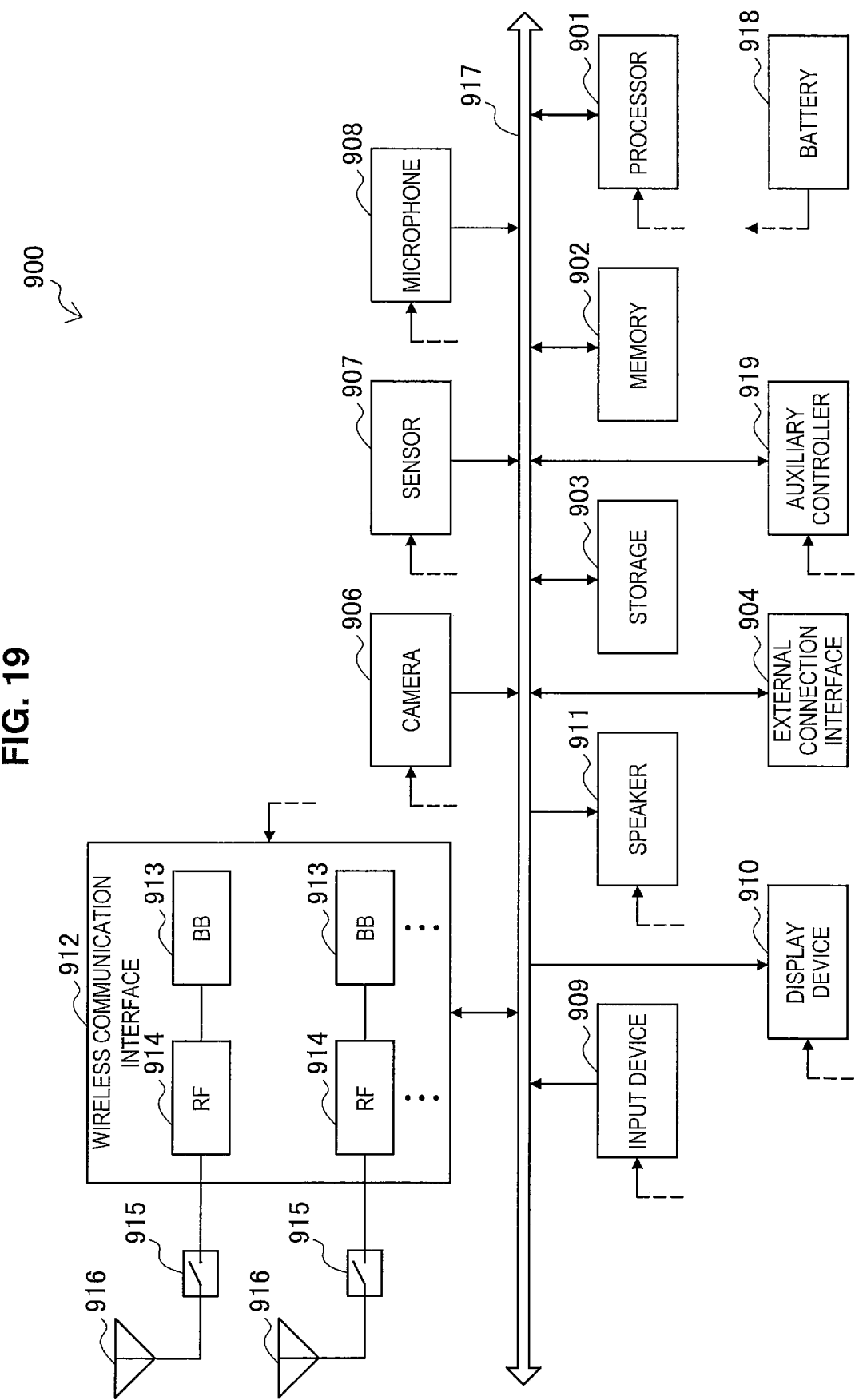
FIG. 19 is a block diagram illustrating an example of a schematic configuration of a smartphone 900 to which the technology of the present disclosure may be applied.

FIG. 19 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives radio signals via the antenna 916. The wireless communication interface 912 may also be a one chip module that has the BB processor 913 and the RF circuit 914 integrated thereon. The wireless communication interface 912 may include the multiple BB processors 913 and the multiple RF circuits 914, as illustrated in FIG. 19. Although FIG. 19 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support another type of wireless communication scheme such as a short-distance wireless communication scheme, a near field communication scheme, and a wireless local area network (LAN) scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive radio signals. The smartphone 900 may include the multiple antennas 916, as illustrated in FIG. 19. Although FIG. 19 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 19 via feeder lines, which are partially shown as dashed lines in the figure. The auxiliary controller 919 operates a minimum necessary function of the smartphone 900, for example, in a sleep mode.

In the smartphone 900 shown in FIG. 19, one or more constituent elements included in the processing unit 140 (the information acquisition unit 141 and/or the control unit 143) described with reference to FIG. 8 may be implemented by the wireless communication interface 912. Alternatively, at least some of these constituent elements may be implemented by the processor 901 or the auxiliary controller 919. As an example, a module which includes a part (for example, the BB processor 913) or all of the wireless communication interface 912, the processor 901 and/or the auxiliary controller 919 may be mounted in the smartphone 900, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the one or more constituent elements may be installed in the smartphone 900, and the wireless communication interface 912 (for example, the BB processor 913), the processor 901 and/or the auxiliary controller 919 may execute the program. As described above, the smartphone 900 or the module may be provided as a device which includes the one or more constituent elements, and the program for causing the processor to function as the one or more constituent elements may be provided. In addition, a readable recording medium in which the program is recorded may be provided.

In addition, in the smartphone 900 shown in FIG. 19, the wireless communication unit 120 described, for example, with reference to FIG. 8 may be implemented by the wireless communication interface 912 (for example, the RF circuit 914). Moreover, the antenna unit 110 may be implemented by the antenna 916.

Second Application Example

FIG. 20 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme such as LET and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives radio signals via the antenna 937. The wireless communication interface 933 may be a one chip module having the BB processor 934 and the RF circuit 935 integrated thereon. The wireless communication interface 933 may include the multiple BB processors 934 and the multiple RF circuits 935, as illustrated in FIG. 20. Although FIG. 20 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support another type of wireless communication scheme such as a short-distance wireless communication scheme, a near field communication scheme, and a wireless LAN scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna), and is used for the wireless communication interface 933 to transmit and receive radio signals. The car navigation device 920 may include the multiple antennas 937, as illustrated in FIG. 20. Although FIG. 20 illustrates the example in which the car navigation device 920 includes the multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 20 via feeder lines that are partially shown as dashed lines in the figure. The battery 938 accumulates power supplied form the vehicle.

In the car navigation device 920 shown in FIG. 20, one or more constituent elements included in the processing unit 140 (the information acquisition unit 141 and/or the control unit 143) described with reference to FIG. 8 may be implemented by the wireless communication interface 933. Alternatively, at least some of these constituent elements may be implemented by the processor 921. As an example, a module which includes a part (for example, the BB processor 934) or all of the wireless communication interface 933 and/or the processor 921 may be mounted in the car navigation device 920, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the one or more constituent elements may be installed in the car navigation device 920, and the wireless communication interface 933 (for example, the BB processor 934) and/or the processor 921 may execute the program. As described above, the car navigation device 920 or the module may be provided as a device which includes the one or more constituent elements, and the program for causing the processor to function as the one or more constituent elements may be provided. In addition, a readable recording medium in which the program is recorded may be provided.

In addition, in the car navigation device 920 shown in FIG. 20, the wireless communication unit 120 described with reference to FIG. 8, for example, may be implemented by the wireless communication interface 933 (for example, the RF circuit 935). Moreover, the antenna unit 110 may be implemented by the antenna 937.

The technology of the present disclosure may also be realized as an in-vehicle system (or a vehicle) 940 including one or more blocks of the car navigation device 920, the in-vehicle network 941, and a vehicle module 942. In other words, the in-vehicle system (or a vehicle) 940 may be provided as a device which includes the one or more constituent elements included in the processing unit 140. The vehicle module 942 generates vehicle data such as vehicle speed, engine speed, and trouble information, and outputs the generated data to the in-vehicle network 941.

3. CONCLUSION

According to an embodiment of the present disclosure described above, the terminal device 100a which can perform effective paging with respect to the other terminal device (the slave terminal) that is a target of paging can be provided in the system in which the terminal device acts like a cell as a master terminal.

According to an embodiment of the present disclosure described above, when paging is performed with respect to the terminal device (the slave terminal) that is a target of paging from the base station, effective paging can be executed via the terminal device (the master terminal) that acts like a cell.

In addition, according to an embodiment of the present disclosure, when paging is performed with respect to the terminal device (the slave terminal) that is a target of paging from the base station, the master terminal prescribes a timing for paging with respect to the slave terminal independently of a timing of paging from the base station with respect to the master terminal. Since the master terminal prescribes the timing for paging with respect to the slave terminal independently of the timing of paging from the base station with respect to the master terminal, the master terminal can efficiently execute paging with respect to the slave terminal.

In addition, according to an embodiment of the present disclosure, the control entity 300 executes a paging process by adding information indicating that paging is destined for the slave terminal in advance. By adding the information indicating paging is destined for the slave terminal in advance, the master terminal can surely receive paging with respect to the slave terminal and thus perform paging with respect to the slave terminal when paging is performed with respect to the terminal device (the slave terminal) that is a target of paging from the base station.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although the example in which the control entity and the base station are different devices has been described, for example, the present disclosure is not limited thereto. For example, the control entity may be implemented in the base station.

In addition, for example, although the example in which the communication system complies with LTE or LTE-A has been described in the embodiment of the present disclosure, the present disclosure is not limited thereto. The communication system may be, for example, a system complying with another communication standard.

In addition, processing steps in processes of the present specification may not necessarily be executed in a time series manner in the order described in the flowcharts or sequence diagrams. The processing steps in the processes may also be executed in, for example, a different order from the order described in the flowcharts or sequence diagrams, or may be executed in parallel.

Furthermore, a computer program for causing a processor (e.g., a CPU, a DSP, etc.) provided in a device (e.g., the terminal device, the base station, the control entity, or a module thereof) of the present specification to function as the device (i.e., a computer program for causing the processor to execute operations of constituent elements of the above-described device) can also be created. In addition, a recording medium in which the computer program is recorded may be provided. Moreover, a device that includes a memory storing the computer program and one or more processors that can execute the computer program (e.g., a finished product or a module for a finished product (a component, a processing circuit, a chip, or the like) may also be provided. In addition, a method including operations of one or more constituent elements of the device (e.g., the information acquisition unit and/or the control unit) is also included in the technology of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
A terminal device including:
an acquisition unit configured to acquire a paging message from a base station; and
a control unit configured to execute paging with respect to one or more other terminal devices that perform wireless communication with the base station via the terminal device on the basis of the paging message acquired by the acquisition unit.

(2)
The terminal device according to (1), in which the acquisition unit acquires a paging message that includes the paging message destined for the other terminal devices.

(3)
The terminal device according to (1) to (2), in which the control unit prescribes a timing of paging with respect to the other terminal devices independently of a timing of paging from the base station.

(4)
The terminal device according to (3), in which the control unit prescribes that paging is executed in a paging frame identical to all of the other terminal devices.

(5)
The terminal device according to (3), in which the control unit prescribes that paging is executed in a paging frame and a subframe identical to all of the other terminal devices.

(6)
The terminal device according to (3), in which the control unit prescribes that paging is executed in different paging frames with respect to each of the other terminal devices.

(7)
The terminal device according to any one of (3) to (6), in which the control unit prescribes that an interval of paging with respect to the other terminal devices be longer than an interval of paging from the base station.

(8)
The terminal device according to any one of (1) to (7), in which the control unit transmits information for identifying the terminal device and information for identifying the other terminal devices to the base station.

(9)
A wireless communication device including:
a control unit configured to execute paging with respect to a first terminal device and a second terminal device that performs wireless communication via the first terminal device; and
an acquisition unit configured to acquire information for prescribing a timing of paging by the control unit with respect to the second terminal device independently of a timing of paging with respect to the first terminal device.

(10)
The wireless communication device according to (9), in which the control unit executes paging with respect to the second terminal device at a timing prescribed by the first terminal device.

(11)
The wireless communication device according to (9), in which the control unit prescribes a timing of paging with respect to the second terminal device on the basis of information acquired by the acquisition unit.

(12)
A wireless communication method including:
acquiring a paging message from a base station; and
executing paging with respect to another terminal device that performs wireless communication with the base station via a terminal device on the basis of the acquired paging message.

(13)
A wireless communication method including:
executing paging with respect to a first terminal device and a second terminal device that performs wireless communication via the first terminal device; and
acquiring information for prescribing a timing of paging with respect to the second terminal device independently of a timing of paging with respect to the first terminal device.

(14)
A computer program causing a computer to execute:
acquiring of a paging message from a base station; and
paging with respect to another terminal device that performs wireless communication with the base station via a terminal device on the basis of the acquired paging message.

(15)
A computer program causing a computer to execute:
paging with respect to a first terminal device and a second terminal device that performs wireless communication via the first terminal device; and
acquiring of information for prescribing a timing of paging with respect to the second terminal device independently of a timing of paging with respect to the first terminal device.

REFERENCE SIGNS LIST 1 communication system
100a, 100b terminal device
200 base station
300 control entity

What is claimed is:
1. A first terminal device comprising circuitry configured to:
receive a Mobile Subscriber Identity of a second terminal device that performs wireless communication with a base station via the first terminal device, from the second terminal device,
receive information of an international mobile subscriber identity (ISMI) from the second terminal device,
transmit the Mobile Subscriber Identity of the second terminal device to the base station,
determine a proxy paging reception timing (PPRT) using the ISMI,
notify the base station of the PPRT,
acquire a paging message from the base station at a paging timing that is determined by the base station based on the Mobile Subscriber Identity of the second terminal device, check whether the paging message includes the Mobile Subscriber Identity of the second terminal device, and in a case that the paging message includes the Mobile Subscriber Identity of the second terminal device, execute a paging with respect to the second terminal device, wherein the paging with respect to the second terminal device causes the second terminal device to transition from an idle mode to a non-idle mode.

2. The first terminal device according to claim 1,
wherein the circuitry is further configured to acquire second information for identifying the second terminal device from the second terminal device.

3. The first terminal device according to claim 1,
wherein the paging message is destined for the second terminal device.

4. The first terminal device according to claim 1,
wherein a paging timing of the paging is prescribed by the base station.

5. The first terminal device according to claim 1,
wherein a first timing for the paging with respect to the second terminal device is prescribed independently of a second timing of the paging message acquired from the base station with respect to the first terminal device.

6. The first terminal device according to claim 1,
wherein the circuitry is further configured to, in a case that the paging message does not include the information of the Mobile Subscriber Identity of the second terminal device, not execute a paging with respect to the second terminal device.

7. The first terminal device according to claim 1,
wherein the circuitry is further configured to acquire a paging message destined for other terminal devices.

8. A base station comprising circuitry configured to:
acquire a Mobile Subscriber Identity of a second terminal device that performs wireless communication with the base station via a first terminal device, from the first terminal device, receive a proxy paging reception timing (PPRT) determined using an international mobile subscriber identity (ISMI) of the second terminal device, transmit the Mobile Subscriber Identity of the second terminal device to the base station, transmit a paging message to the first terminal device, cause the first terminal device to execute a paging with respect to the second terminal device by including the information of the Mobile Subscriber Identity of the second terminal device in the paging message, wherein the paging with respect to the second terminal device causes the second terminal device to transition from an idle mode to a non-idle mode.

9. A method for communication in a wireless communication system comprising a first terminal device, a second terminal device, and a base station, the method comprising:
receiving a Mobile Subscriber Identity of a second terminal device that performs wireless communication with the base station via the first terminal device, from the second terminal device, receiving information of an international mobile subscriber identity (ISMI) from the second terminal device, transmitting the Mobile Subscriber Identity of the second terminal device to the base station, determining a proxy paging reception timing (PPRT) using the ISMI, notifying the base station of the PPRT, acquiring a paging message from the base station at a paging timing that is determined by the base station based on the Mobile Subscriber Identity of the second terminal device, checking whether the paging message includes the information of the mobile subscriber identity of-the second terminal device, and in a case that the paging message includes the information of the Mobile Subscriber Identity of the second terminal device, executing a paging with respect to the second terminal device, wherein the paging with respect to the second terminal device causes the second terminal device to transition from an idle mode to a non-idle mode.

10. The method according to claim 9, further comprising:
acquiring second information for identifying the second terminal device from the second terminal device.

11. The method according to claim 9,
wherein the paging message is destined for the second terminal device.

12. The method according to claim 9,
wherein a paging timing of the paging is prescribed by the base station.

13. The method according to claim 9,
wherein a first timing for the paging with respect to the second terminal device is prescribed independently of a second timing of the paging message acquired from the base station with respect to the first terminal device.

14. The method according to claim 9, further comprising:
in a case that the paging message does not include the information of the Mobile Subscriber Identity of the second terminal device, not executing a paging with respect to the second terminal device.

15. The method according to claim 9, further comprising:
acquiring a paging message destined for other terminal devices.

* * * * *